US012812137B2

(12) United States Patent
Chen et al.

(10) Patent No.: US 12,812,137 B2
(45) Date of Patent: *Nov. 24, 2026

(54) CROSS COMPONENT DETERMINATION OF CHROMA AND LUMA COMPONENTS OF VIDEO DATA

(71) Applicant: BEIJING DAJIA INTERNET INFORMATION TECHNOLOGY CO., LTD., Beijing (CN)

(72) Inventors: Yi-Wen Chen, San Diego, CA (US); Xiaoyu Xiu, San Diego, CA (US); Tsung-Chuan Ma, San Diego, CA (US); Hong-Jheng Jhu, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 164 days.

This patent is subject to a terminal disclaimer.

(21) Appl. No.: 18/676,995

(22) Filed: May 29, 2024

(65) Prior Publication Data

US 2024/0323410 A1 Sep. 26, 2024

Related U.S. Application Data

(63) Continuation of application No. 17/854,455, filed on Jun. 30, 2022, now Pat. No. 12,267,509, which is a (Continued)

(51) Int. Cl.

*H04N 19/186* (2014.01)
*H04N 19/132* (2014.01)

(Continued)

(52) U.S. Cl.

CPC ......... *H04N 19/186* (2014.11); *H04N 19/132* (2014.11); *H04N 19/167* (2014.11);

(Continued)

(58) Field of Classification Search

CPC .. H04N 19/186; H04N 19/132; H04N 19/167; H04N 19/176; H04N 19/182; H04N 19/197; H04N 19/70

See application file for complete search history.

(56) References Cited

U.S. PATENT DOCUMENTS

| | | | |
|---|---|---|---|
| 9,906,790 | B2 | 2/2018 | Kim et al. |
| 2014/0153844 | A1 | 6/2014 | Jeon et al. |

(Continued)

FOREIGN PATENT DOCUMENTS

| | | | |
|---|---|---|---|
| CN | 109196867 | A | 1/2019 |
| EP | 3399735 | A1 | 11/2018 |

(Continued)

OTHER PUBLICATIONS

Office Action corresponding to Chinese Patent Application No. 202410877837.8 (Foreign Text, 8 Pages, English Translation Thereof, 8 Pages) (Aug. 27, 2025).

(Continued)

*Primary Examiner* — Kyle M Lotfi

(74) *Attorney, Agent, or Firm* — Myers Bigel, P.A.

(57) ABSTRACT

This application is directed to decoding video data including a plurality of luma components of a plurality of pixels in a video frame. The plurality of pixels belong to a coding block, and include a boundary pixel that is inside the coding block, the boundary pixel is immediately adjacent to a boundary of the coding block. One or more neighboring pixels of the boundary pixel are outside of the coding block and determined as being not available. A respective luma component corresponding to the boundary pixel is assigned (Continued)

to a luma component corresponding to each of the one or more neighboring pixels. A boundary luma component is determined based, at least, on the luma components of the one or more neighboring pixels and the boundary pixel according to a predefined luma interpolation scheme. A boundary chroma component is converted from the boundary luma component according to a linear mapping model.

19 Claims, 14 Drawing Sheets

Related U.S. Application Data continuation of application No. PCT/US2020/067356, filed on Dec. 29, 2020.

(60) Provisional application No. 62/955,348, filed on Dec. 30, 2019.

(51) Int. Cl.

| | |
|---|---|
| ***H04N 19/167*** | (2014.01) |
| ***H04N 19/176*** | (2014.01) |
| ***H04N 19/182*** | (2014.01) |
| ***H04N 19/196*** | (2014.01) |
| ***H04N 19/70*** | (2014.01) |

(52) U.S. Cl.

CPC ......... *H04N 19/176* (2014.11); *H04N 19/182* (2014.11); *H04N 19/197* (2014.11); *H04N 19/70* (2014.11)

(56) References Cited

U.S. PATENT DOCUMENTS

| | | | |
|---|---|---|---|
| 2014/0369426 | A1 | 12/2014 | Li et al. |
| 2015/0043641 | A1 | 2/2015 | Gamei et al. |
| 2016/0277762 | A1 | 9/2016 | Zhang et al. |
| 2017/0085917 | A1 | 3/2017 | Hannuksela |
| 2017/0099490 | A1 | 4/2017 | Seregin et al. |
| 2017/0359595 | A1 | 12/2017 | Zhang et al. |
| 2017/0366818 | A1 | 12/2017 | Zhang et al. |
| 2018/0176594 | A1 | 6/2018 | Zhang et al. |
| 2021/0281831 | A1 | 9/2021 | Alshin et al. |
| 2022/0295056 | A1 | 9/2022 | Lim |

FOREIGN PATENT DOCUMENTS

| | | | |
|---|---|---|---|
| JP | 2016524878 | A | 8/2016 |
| JP | 2018050150 | A | 3/2018 |
| JP | 2018514119 | A | 5/2018 |
| KR | 1020130004133 | | 1/2013 |
| KR | 20180135075 | A | 12/2018 |
| WO | 2018118940 | A1 | 6/2018 |
| WO | 2019195215 | A1 | 10/2019 |
| WO | 2020076835 | A1 | 4/2020 |
| WO | 2020169113 | A1 | 8/2020 |

OTHER PUBLICATIONS

First Examination Report for IN Application No. 202247042362 Mailed Nov. 11, 2022, 5 pages.

Office Action for JP Patent Application No. 2022-540678 mailed Nov. 16, 2022, 15 pages.

Office Action for KR Application No. 10-2022-7026161 mailed Jan. 1, 2023, with translation, 6 pages.

Prior Art Search Report for Korean Application No. 10-2022-7026161 dated Jul. 27, 2022, 22 pages.

"International Search Report and Written Opinion of the International Searching Authority", International Application No. PCT/US2020/067356, Apr. 15, 2021, 7 pp.

Chen, Yi-Wen , et al., "AHG16: On derivation of CCLM predictors", Joint Video Experts Team (JVET) of ITU-T SG 16 WP 3 and ISO/IEC JTC 1/SC 29/WG 11, 17th Meeting: Brussels, BE, Jan. 7-17, 2020, 8 pages.

Filippov, Alexey , et al., "CE3-3.2: Simplified and robust CCLM parameter derivation", Joint Video Experts Team (JVET) of ITU-T SG 16 WP and ISO/IEC JTC 1/SC 29/WG 11, 15th Meeting: Gothenburg, SE Jul. 3-12, 2019, 4 pages.

Ikeda, Masaru , et al., "CE3-3.1: Modified beta derivation for CCLM", Joint Video Experts Team (JVET) of ITU-T SG 16 WP and ISO/IEC JTC 1/SC 29/WG 11, 15th Meeting: Gothenburg, SE Jul. 3-12, 2019, 4 pages.

Zhang, Kai , et al., "CE3-related: CCLM prediction with single-line neighbouring luma samples",Joint Video Experts Team (JVET) of ITU-T SG 16 WP 3 and ISO/IEC JTC 1/SC 29/WG 11, 12th Meeting: Macao, CN Oct. 3-12, 2018, 3 pages.

Japanese Office Action corresponding to Japanese Application No. 2023-094405 (8 pages, foreign text; 7 pages, English translation thereof) (mailed Aug. 6, 2024).

"Communication pursuant to Article 94(3) EPC", EP Application No. 20908551.3, Feb. 28, 2023, 13 pp.

"Trial and Appeal Decision—JP Appeal No. 2023-9475", JP Application No. 2022-540678, May 7, 2024, 51 pp.

Chen, et al., "Algorithm description for Versatile Video Coding and Test Model 7 (VTM 7)", Document JVET-P2022-v1, Joint Video Experts Team (JVET) of ITU-T SG 16 WP 3 and ISO/IEC JTC 1/SC 29/WG 11, 16th Meeting: Geneva, CH, Oct. 1-11, 2019, Oct. 2019, 90 pp.

Chen, et al., "Algorithm Description of Joint Exploration Test Model 5", Document: JVET-E1001-v1, Joint Video Exploration Team (JVET) of ITU-T-SG 16 WP 3 and ISO/IEC JTC 1/SC 29/WG 11, 5th Meeting: Geneva, CH, Jan. 12-20, 2017, Jan. 2017, 44 pp.

Chen, et al., "Description of SDR, HDR and 360° video coding technology proposal by Qualcomm and Technicolor—low and high complexity versions", Document: JVET-J0021, Joint Video Exploration Team (JVET) of ITU-T-SG 16 WP 3 and ISO/IEC JTC 1/SC 29/WG 11, 10th Meeting: San Diego, US, Apr. 10-20, 2018, Apr. 2018, 44 pp.

Hanhart, et al., "Description of Core Experiment 13 (CE13): Coding tools for 360° omnidirectional video", Document: JVET-L1033-v2, Joint Video Exploration Team (JVET) of ITU-T SG 16 WP 3 and ISO/IEC JTC 1/SC 29/WG 11, 12th Meeting: Macau, CN, Oct. 3-12, 2018, 16 pp.

CROSS COMPONENT DETERMINATION OF CHROMA AND LUMA COMPONENTS OF VIDEO DATA

RELATED APPLICATIONS

This application is a continuation of U.S. patent application Ser. No. 17/854,455, filed Jun. 30, 2022, which is a continuation of International Application No.: PCT/US2020/067356, filed on Dec. 29, 2020, which is based upon and claims priority to U.S. Provisional Patent Application No. 62/955,348, titled "Simplifications of Cross-Component Linear Model," filed Dec. 30, 2019, which is incorporated by reference in its entirety.

TECHNICAL FIELD

The present application generally relates to video data coding and compression, and in particular, to methods and systems of improvement in coding of chroma and luma samples of a video frame in a bitstream of video data.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards as defined by MPEG-4, ITU-T H.263, ITU-T H.264/MPEG-4, Part 10, Advanced Video Coding (AVC), High Efficiency Video Coding (HEVC), and Versatile Video Coding (VVC) standard. Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or IBC modes. Video blocks in an intra coded (I) slice of a video frame are encoded using spatial prediction with respect to reference samples in neighboring blocks within the same video frame. Video blocks in an inter coded (P or B) slice of a video frame may use spatial prediction with respect to reference samples in neighboring blocks within the same video frame or temporal prediction with respect to reference samples in other previous and/or future reference video frames.

Spatial or temporal prediction based on a reference block that has been previously encoded, e.g., a neighboring block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

A cross-component prediction mode is applied to reduce cross-component redundancy between luma and chroma samples of the video bitstream. Specifically, in the prediction model, the luma samples are down-sampled and used to predict the chroma samples. However, luma samples are not available at some positions of a video frame, and different down-sampling filters have been used to generate the down-sampled luma samples near these positions. Application of different down-sampling filters is not compatible with parallel image processing and could cause a bottleneck to a rate of processing the video bitstream. It would be beneficial to have a more efficient cross-component prediction mechanism than the current practice.

SUMMARY

The present application describes implementations related to video data encoding and decoding and, more particularly, to methods and systems of improvement in coding of chroma and luma samples of a video frame in a bitstream of video data. Sample padding is applied to luma samples to generate unavailable luma samples used by a luma down-sampling process. The unavailable samples may be external to the video frame or an image slice, or have not been coded yet and will be coded subsequently. These unavailable samples are optionally generated by repetitive padding or mirror padding. As such, the same down-sampling filter can be used to generate all of the down-sampled luma samples across the entire video frame, which enables parallel video processing and enhances the corresponding video processing rate of the video data bitstream.

In one aspect of this application, a method for decoding video data is implemented at an electronic device. The method includes obtaining, from a bitstream, a plurality of luma samples for a plurality of pixels in a video frame. The plurality of pixels belong to a coding block and includes a boundary pixel, and the boundary pixel is inside the coding block and immediately adjacent to a boundary of the coding block. The method further includes determining that one or more neighboring pixels of the boundary pixel are not available, assigning a luma sample corresponding to the boundary pixel to a luma sample corresponding to each of the one or more neighboring pixels, and determining a boundary luma sample based, at least, on the luma samples of the one or more neighboring pixels and the boundary pixel according to a predefined luma interpolation scheme. Each of the one or more neighboring pixels is outside the coding block. The method further includes determining a boundary chroma sample from the boundary luma sample according to a linear mapping model. In some embodiments, the one or more neighboring pixels of the boundary pixel are external to the video frame or an image slice. Alternatively, in some embodiments, the one or more neighboring pixels of the boundary pixel have not been coded yet and will be coded subsequently to the coding block.

In another aspect of the application, an electronic device includes one or more processing units, memory and a plurality of programs stored in the memory. The programs, when executed by the one or more processing units, cause the electronic device to perform the methods of decoding video data as described above.

In yet another aspect, a non-transitory computer readable storage medium stores a plurality of programs for execution by an electronic device having one or more processing units. The programs, when executed by the one or more processing units, cause the electronic device to perform the methods of decoding video data as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
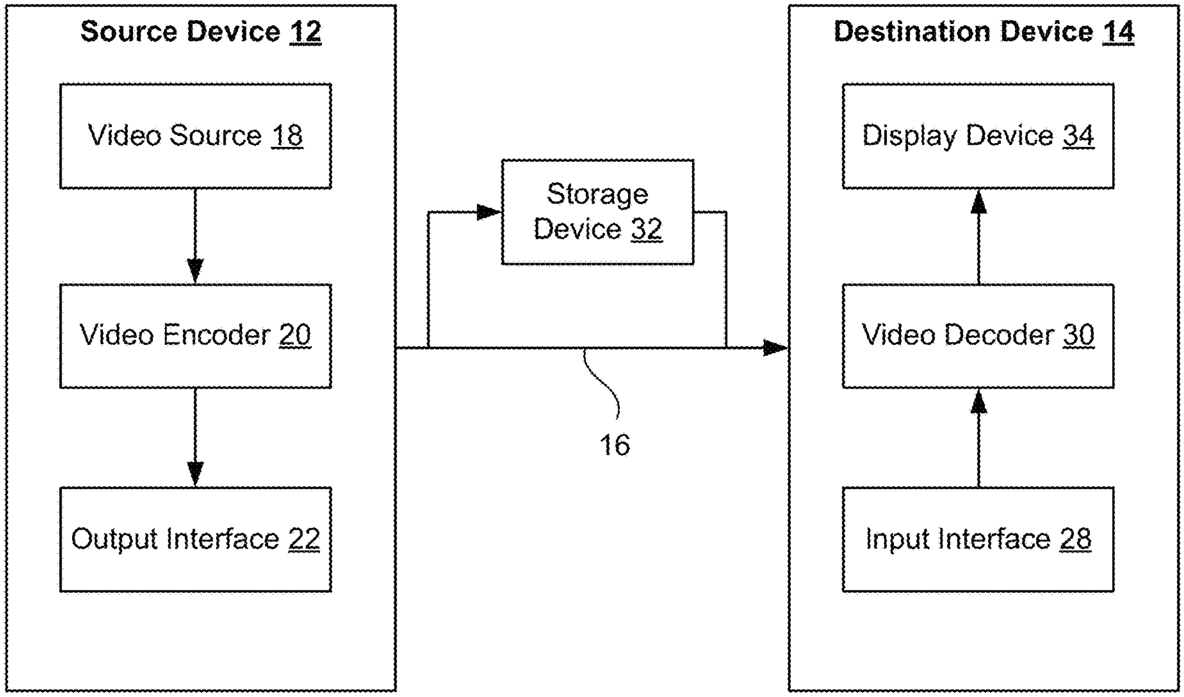
FIG. 1 is a block diagram illustrating an exemplary video encoding and decoding system in accordance with some implementations of the present disclosure.

FIG. 1 is a block diagram illustrating an exemplary system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
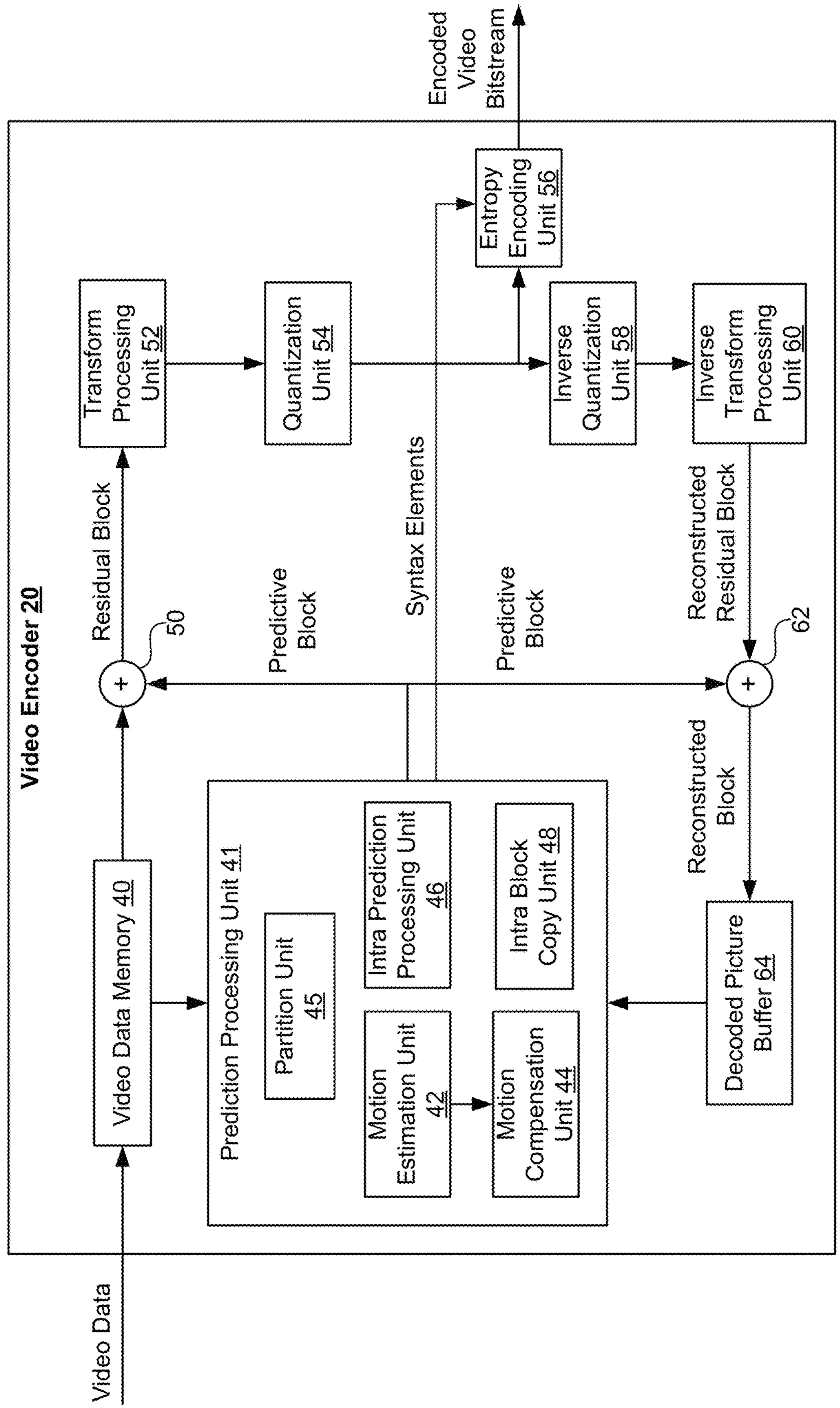
FIG. 2 is a block diagram illustrating an exemplary video encoder in accordance with some implementations of the present disclosure.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. A deblocking filter (not shown) may be positioned between summer 62 and DPB 64 to filter block boundaries to remove blockiness artifacts from reconstructed video. An in loop filter (not shown) may also be used in addition to the deblocking filter to filter the output of summer 62. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such models for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
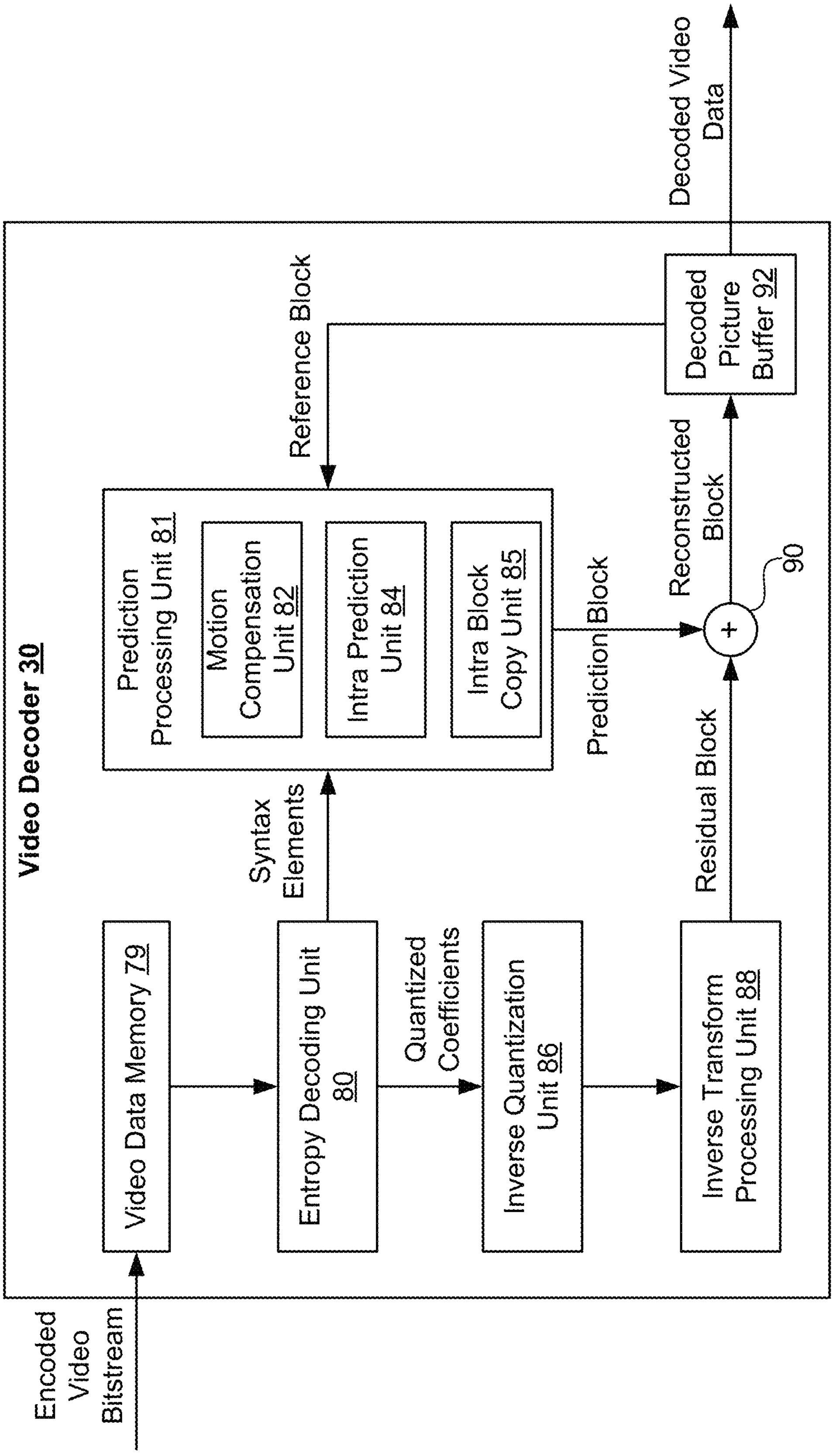
FIG. 3 is a block diagram illustrating an exemplary video decoder in accordance with some implementations of the present disclosure.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction processing unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction processing unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction processing unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
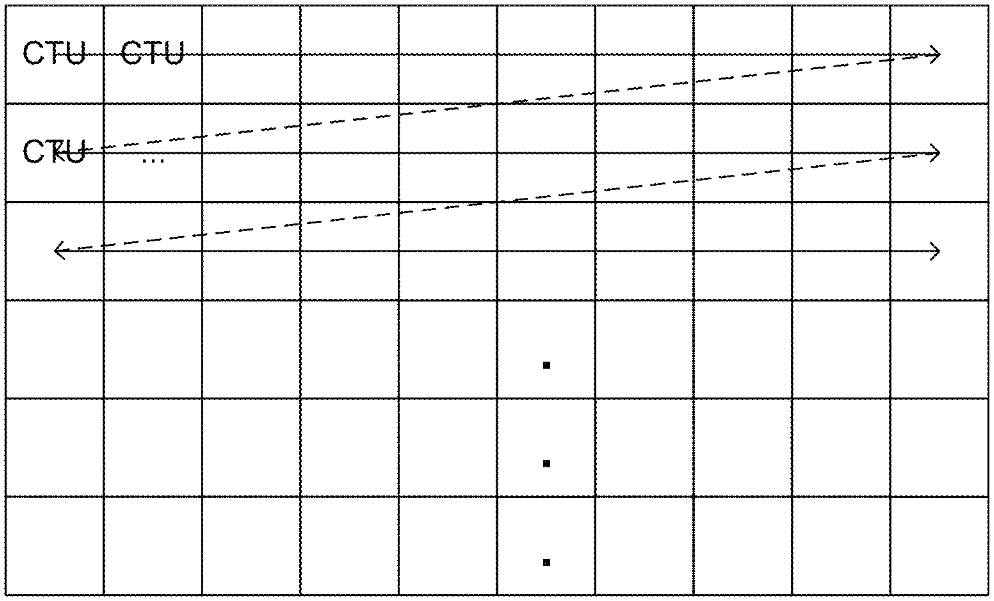
FIGS. 4A through 4E are block diagrams illustrating how a frame is recursively partitioned into multiple video blocks of different sizes and shapes in accordance with some implementations of the present disclosure.
Figure 4B:
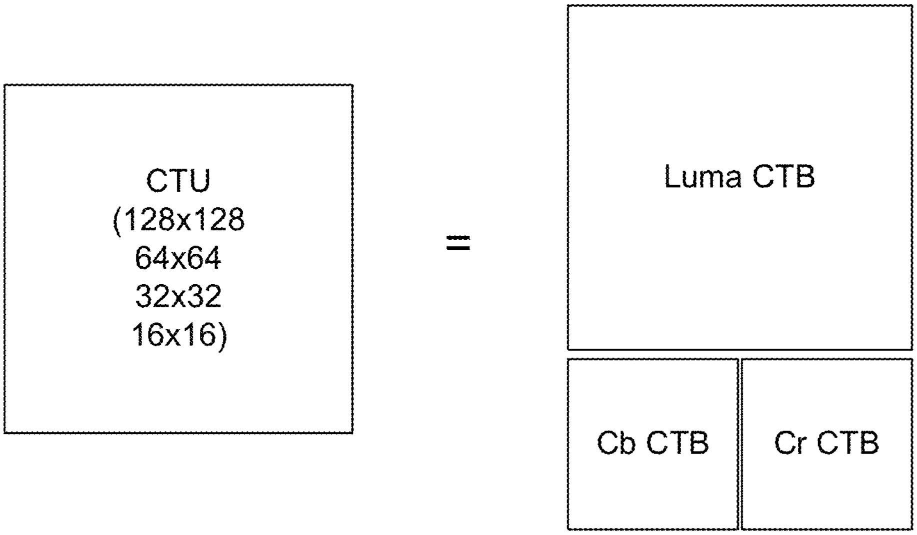

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
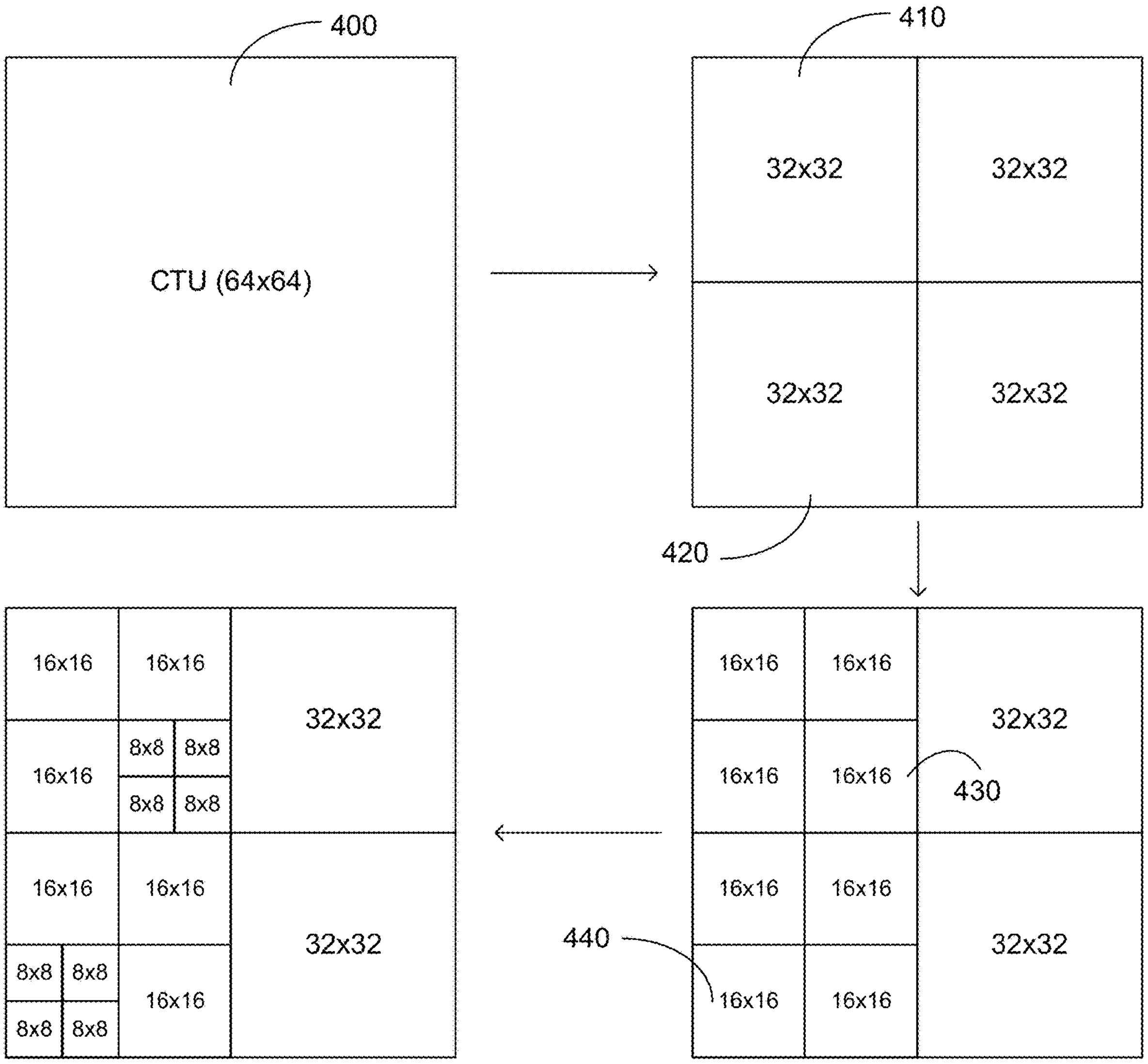
Figure 4D:
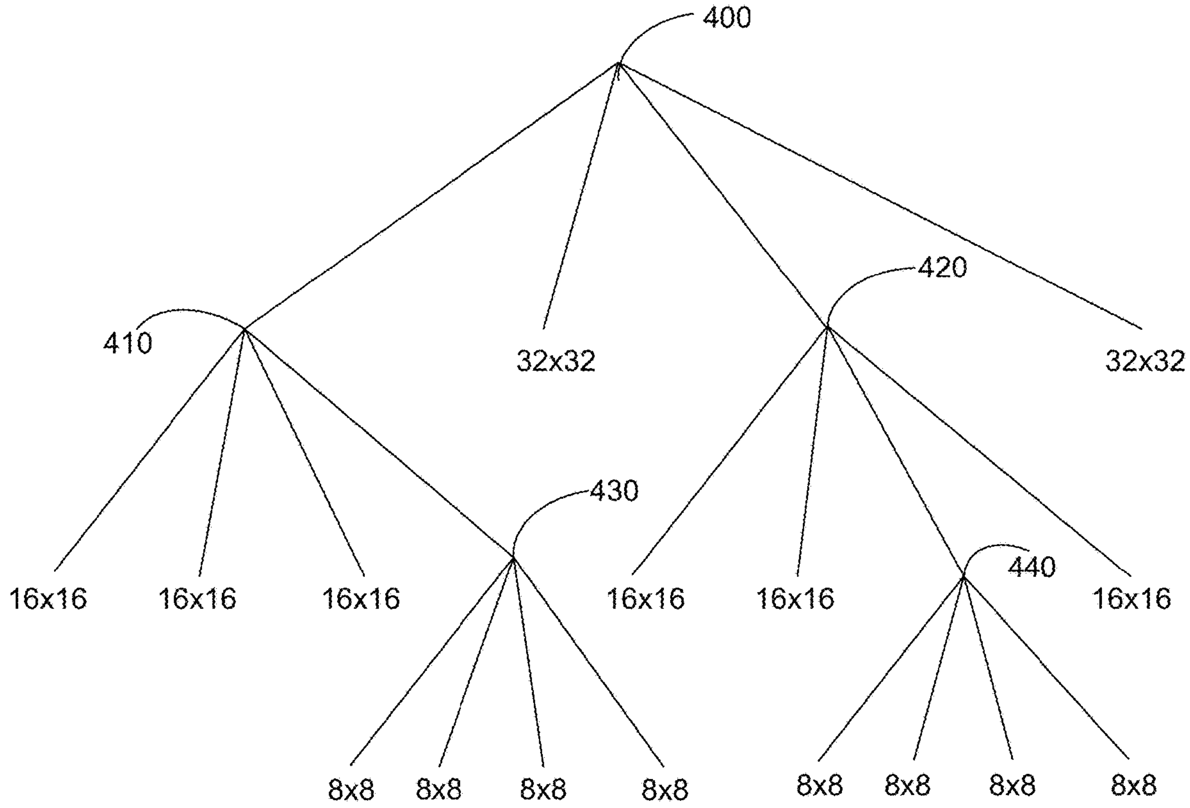
Figure 4E:
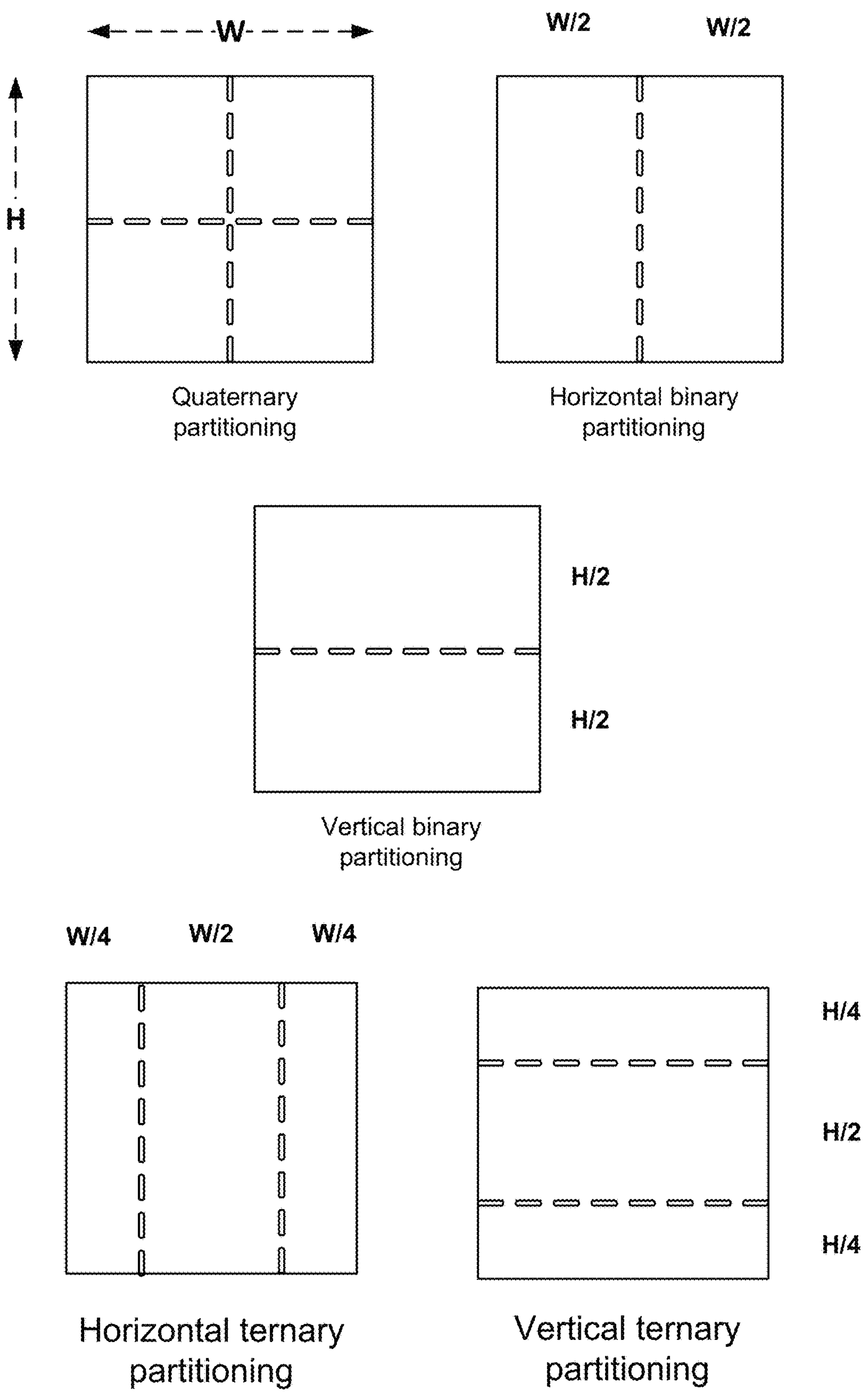

To achieve a better performance, video encoder 20 may recursively perform tree partitioning such as binary-tree partitioning, ternary-tree partitioning, quad-tree partitioning or any combination thereof on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five partitioning types, i.e., quaternary partitioning, horizontal binary partitioning, vertical binary partitioning, horizontal ternary partitioning, and vertical ternary partitioning.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). Palette-based coding is another coding scheme that has been adopted by many video coding standards. In palette-based coding, which may be particularly suitable for screen-generated content coding, a video coder (e.g., video encoder 20 or video decoder 30) forms a palette table of colors representing the video data of a given block. The palette table includes the most dominant (e.g., frequently used) pixel values in the given block. Pixel values that are not frequently represented in the video data of the given block are either not included in the palette table or included in the palette table as escape colors.

Each entry in the palette table includes an index for a corresponding pixel value that in the palette table. The palette indices for samples in the block may be coded to indicate which entry from the palette table is to be used to predict or reconstruct which sample. This palette mode starts with the process of generating a palette predictor for a first block of a picture, slice, tile, or other such grouping of video blocks. As will be explained below, the palette predictor for subsequent video blocks is typically generated by updating a previously used palette predictor. For illustrative purpose, it is assumed that the palette predictor is defined at a picture level. In other words, a picture may include multiple coding blocks, each having its own palette table, but there is one palette predictor for the entire picture.

To reduce the bits needed for signaling palette entries in the video bitstream, a video decoder may utilize a palette predictor for determining new palette entries in the palette table used for reconstructing a video block. For example, the palette predictor may include palette entries from a previously used palette table or even be initialized with a most recently used palette table by including all entries of the most recently used palette table. In some implementations, the palette predictor may include fewer than all the entries from the most recently used palette table and then incorporate some entries from other previously used palette tables. The palette predictor may have the same size as the palette tables used for coding different blocks or may be larger or smaller than the palette tables used for coding different blocks. In one example, the palette predictor is implemented as a first-in-first-out (FIFO) table including 54 palette entries.

To generate a palette table for a block of video data from the palette predictor, a video decoder may receive, from the encoded video bitstream, a one-bit flag for each entry of the palette predictor. The one-bit flag may have a first value (e.g., a binary one) indicating that the associated entry of the palette predictor is to be included in the palette table or a second value (e.g., a binary zero) indicating that the associated entry of the palette predictor is not to be included in the palette table. If the size of palette predictor is larger than the palette table used for a block of video data, then the video decoder may stop receiving more flags once a maximum size for the palette table is reached.

In some implementations, some entries in a palette table may be directly signaled in the encoded video bitstream instead of being determined using the palette predictor. For such entries, the video decoder may receive, from the encoded video bitstream, three separate m-bit values indicating the pixel values for the luma and two chroma components associated with the entry, where m represents the bit depth of the video data. Compared with the multiple m-bit values needed for directly signaled palette entries, those palette entries derived from the palette predictor only require a one-bit flag. Therefore, signaling some or all palette entries using the palette predictor can significantly reduce the number of bits needed to signal the entries of a new palette table, thereby improving the overall coding efficiency of palette mode coding.

In many instances, the palette predictor for one block is determined based on the palette table used to code one or more previously coded blocks. But when coding the first coding tree unit in a picture, a slice or a tile, the palette table of a previously coded block may not be available. Therefore a palette predictor cannot be generated using entries of the previously used palette tables. In such case, a sequence of palette predictor initializers may be signaled in a sequence parameter set (SPS) and/or a picture parameter set (PPS), which are values used to generate a palette predictor when a previously used palette table is not available. An SPS generally refers to a syntax structure of syntax elements that apply to a series of consecutive coded video pictures called a coded video sequence (CVS) as determined by the content of a syntax element found in the PPS referred to by a syntax element found in each slice segment header. A PPS generally refers to a syntax structure of syntax elements that apply to one or more individual pictures within a CVS as determined by a syntax element found in each slice segment header. Thus, an SPS is generally considered to be a higher level syntax structure than a PPS, meaning the syntax elements included in the SPS generally change less frequently and apply to a larger portion of video data compared to the syntax elements included in the PPS.

Figure 5:
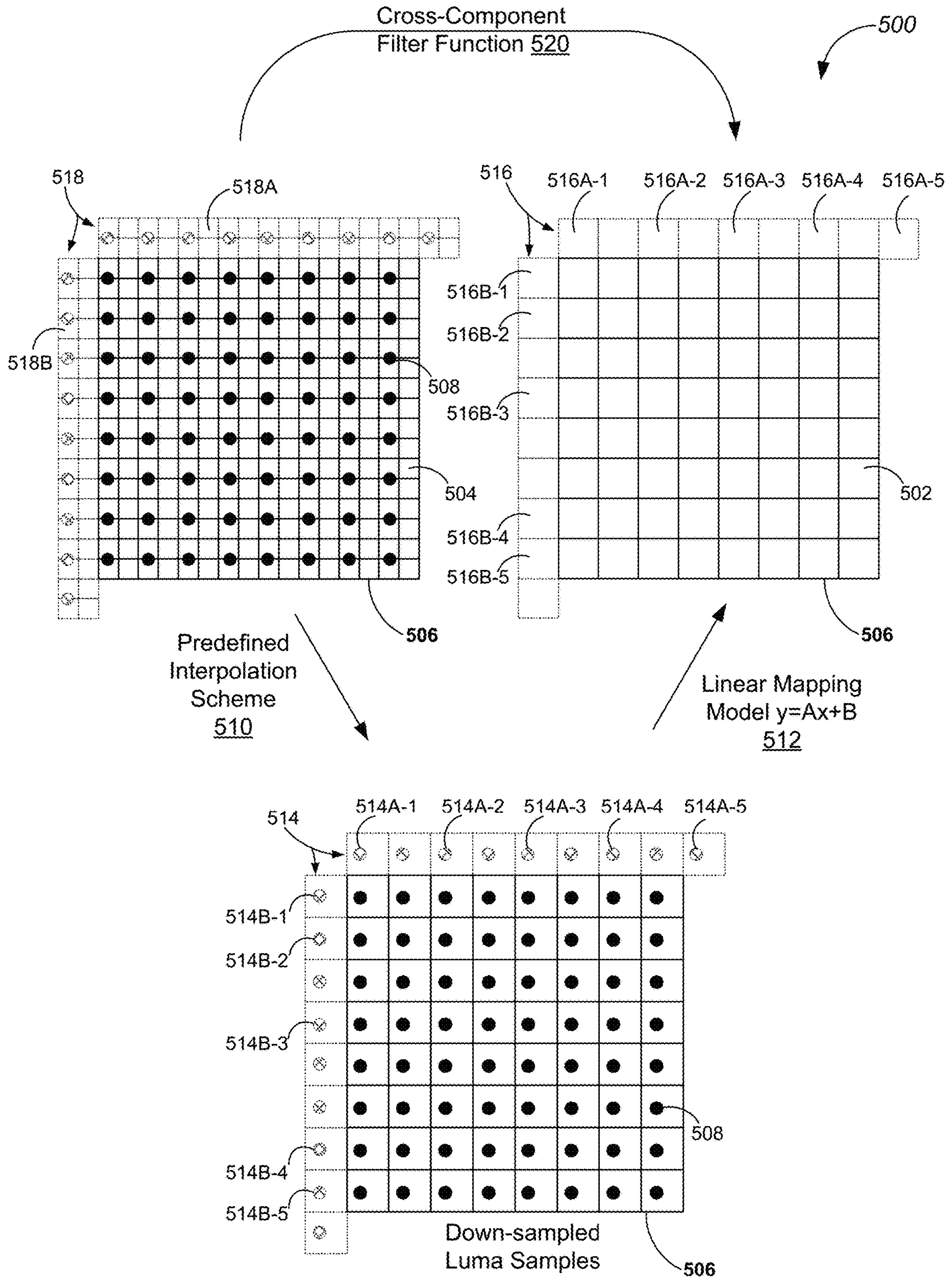
FIG. 5 illustrates a process of deriving chroma samples from luma samples of a coding block of a video frame of a bitstream, in accordance with some embodiments.

FIG. 5 illustrates a process 500 of deriving chroma samples 502 from luma samples 504 of a coding block 506 of a video frame of a bitstream, in accordance with some embodiments. The coding block 506 of the video frame includes a plurality of pixels and each pixel is made of a plurality of color elements (e.g., blue, green and red). In video encoding and decoding, brightness and color information of the plurality of pixels is represented by a plurality of luma samples 504 and a plurality of chroma samples 502, respectively. Each of the plurality of pixels uniquely corresponds to a single respective luma sample 504. Each chroma sample 502 corresponds to a respective set of luma samples 504 according to a subsampling scheme. Each luma sample has a luma component Y', and each chroma sample 502 has a blue-difference chroma component Cb and a red-difference chroma component Cr. The subsampling scheme of the luma and chroma components (Y':Cb:Cr) has a three-part ratio, e.g., 4:1:1, 4:2:0, 4:2:2, 4:4:4, and 4:4:0. In FIG. 5, the luma samples 504 and chroma samples 502 of the video frame comply with the subsampling scheme having the three-part ratio equal to 4:1:1.

In some embodiments, the coding block 506 of the video frame includes 2M×2N pixels corresponding to 2M luma samples across a width and 2N luma samples across a height. M and N are optionally equal to or different from each other. In accordance with the example subsampling scheme of the luma and chroma components (Y':Cb:Cr=4:1:1) in FIG. 5, the luma samples 504 of the video frame are encoded with a resolution of 2M×2N, while the chroma samples 502 are encoded with a smaller resolution of M×N. In practice, the chroma samples 502 can be encoded with different chroma resolutions such as 2M×2N (e.g., 4:4:4 full sampling), 2M×N (e.g., 4:4:0 sub-sampling), M×2N (e.g., 4:2:2 sub-sampling), and ½ M×2N (e.g., 4:1:1 sub-sampling).

In some embodiments, the chroma samples 502 and the luma samples 504 of the same video frame are coded separately in the video encoder 20, transferred from the video encoder 20 to the video decoder 30, and decoded separately in the video decoder 30. The luma samples 504 may be used to refine the decoded chroma samples 502 in some situations. Alternatively, in some embodiments, the luma samples 504 of the coding block 506 of the video frame is encoded in the video encoder 20 and provided to the video decoder 30 without the chroma samples 502 of the same coding block 506 of the video frame. The luma samples 504 of the coding block 506 are reconstructed in the video decoder 30, and the chroma samples 502 are derived from the reconstructed luma samples 504 of the coding block 506. Given that the luma samples 504 have a first luma resolution that is greater than a second chroma resolution of the chroma samples 502, the luma samples 504 of the coding block 506 are converted to a set of down-sampled luma samples 508 that have a third luma resolution equal to the second chroma resolution according to a predefined luma interpolation scheme 510. The set of down-sampled luma samples 508 are further converted to the chroma samples 502 of the coding block 506 of the video frame according to a linear mapping model 512, which is represented as follows:

$$Y = \alpha X + \beta \tag{1}$$

where X and Y correspond to a luminance value of a down-sampled luma sample 508 and a chrominance value of a corresponding chroma sample 502, respectively, and a and 3 are two linear coefficients of the linear mapping model 512.

Specifically, a luminance value of each down-sampled luma sample 508 (DLuma) 508 is derived from luminance values of a number of neighbouring luma samples (Luma) 504 according to the luma interpolation scheme 510 as follows:

$$DLuma = \sum_i^k f(i) \cdot Luma(i) \tag{2}$$

where k represents the number of neighboring luma samples, and f(i) represents filter coefficients for each of the k neighboring luma samples 504. The linear interpolation scheme 510 can be combined with the linear mapping model 512 to determine a luma-chroma cross-component filter model 520 as follows:

$$Y = \alpha X + \beta D = \sum_i^k \alpha \cdot f(i) \cdot Luma(i) + \beta \tag{3}$$

Each chroma sample 502 can be directly derived from the k neighboring luma samples 504 based on a cross-component linear model, i.e., using the above cross-component filter model 520. In some embodiments, given the two linear coefficients α and β for each coding block 506, all of the chroma samples 502 of the coding block 506 are directly derived from the luma samples 504 located in the same respective coding block 506 using the cross-component filter model 520.

In some embodiments, the luma samples 504 and chroma samples 502 of the video frame comply with the subsampling scheme in which every four luma samples 504 correspond to one chroma sample 504 having the blue-difference chroma component Cb and the red-difference chroma component Cr on average. Stated another way, the first luma resolution of the luma samples 504 is four times of the second chroma resolution of the chroma samples 502. On average, every four luma samples 504 are combined into one down-sampled luma sample 508 in the set of luma samples 508 that have the third luma resolution equal to the second chroma resolution. In some embodiments, for each luma sample 508, more than four neighbouring luma samples 504 are applied to derive the respective chroma sample 502. For a subset of the luma samples 504, each luma sample 504 is applied more than once to generate more than one down-sampled luma sample 508 and/or more than one chroma sample 502. More details on down-sampling multiple luma samples 504 to a luma sample 508 and/or a chroma sample 502 based on the predefined interpolation scheme 510 are discussed below with reference to FIGS. 6A-6D.

In some embodiments, the linear mapping model 512 that is applied to convert the luma samples 508 to the chroma samples 502 is derived using a Max-Min method. Specifically, a maximum down-sampled luma sample is identified from a set of down-sampled luma samples, and a minimum down-sampled luma sample is identified from the set of down-sampled luma samples. A maximum chroma sample corresponds to the maximum down-sampled luma sample, and a minimum chroma sample corresponds to the minimum down-sampled luma sample. The maximum and minimum chroma samples are applied with the maximum and minimum down-sampled luma samples to determine the linear mapping model 512, i.e., determine two coefficients α and β in equation (1). After the linear mapping model 512 is derived, the video codec applies the linear mapping model 512 to the luma samples 508 down-sampled from the luma samples 504 to generate the corresponding chroma samples 502 in the coding block 506.

Coding blocks of the video frame are reconstructed according to an ordered sequence. In some situations, the coding block 506 is not on the first row or the first column of the video frame, and when the coding block 506 is being processed, a selected group of pixels have been reconstructed. For example, the selected group of pixels include pixels located immediately above and to the left of the pixels in the coding block 506. A selected group of chroma samples 516, luma samples 518, and down-sampled luma samples 514 have been reconstructed for the selected group of pixels, and can be used to derive the linear mapping model 512, e.g., based on the Max-Min method. The chroma samples 516, luma samples 518, and down-sampled luma samples 514 are external to and immediately adjacent to a boundary of the coding block 506. Specifically, in some embodiments, the video codec searches a group of down-sampled luma samples that have been coded (e.g., the selected group of down-sampled luma samples 514 corresponding to top neighboring luma samples and left neighboring luma samples) to identify the maximum down-sampled luma sample 514A-1 and the minimum down-sampled luma sample 514B-1. The video codec then identifies previously-coded chroma samples 516A-1 and 516B-1 (e.g., in the selected group of chroma samples 516 including top neighboring chroma samples and left neighboring chroma samples) corresponding to the maximum and minimum down-sampled luma samples 514A-1 and 514B-1. As such, the linear mapping model 512 can be derived based on these associated down-sampled luma samples (514A-1 and 514B-1) and chroma samples (516A-1 and 516B-1).

Alternatively, in some embodiments, the video codec searches a group of luma samples (e.g., the selected group of luma samples 518 including the top and left neighboring luma samples) to identify (i) a luma sample 518A having the maximum luma value and (ii) a luma sample 518B having the minimum luma value in the group of luma samples without performing down-sampling on the selected group of luma samples to identify the maximum and minimum luma samples 518A and 518B. The video codec then performs down-sampling in a region (e.g., a region with six samples using weighted-averaging schemes known in the art including six-tap down-sampling or like) associated with the maximum and the minimum luma samples 518A and 518B to generate a down-sampled luma sample 514A-2 as the maximum luma sample (which may or may not be exactly the maximum down-sampled luma sample 514A-1) and a down-sampled luma sample 514B-2 as the minimum luma sample (which may or may not be exactly the minimum down-sampled luma sample 514B-1). The video codec then identifies chroma sample 516A-2 and 516B-2 (e.g., in the group of chroma samples 516 including the top and left neighboring chroma samples) corresponding to the down-sampled luma samples 514A-2 and 514B-2. As such, the linear mapping model 512 can be derived based on the down-sampled luma samples (514A-2 and 514B-2) and chroma samples (516A-2 and 516B-2).

Alternatively, in some embodiments, the video codec searches a group of chroma samples (e.g., the group of chroma samples 516 including the top and left neighboring chroma samples) to identify the maximum and the minimum chroma samples 516A-3 and 516B-3 (e.g., the chroma samples having the maximum and minimum chroma values, respectively). The video codec then identifies the down-sampled luma samples 514A-3 and 514B-3 (e.g., among the group of down-sampled luma samples 514 including top and left neighboring luma samples) corresponding to the maximum and min chroma samples 516A-3 and 516B-3. As such, the linear mapping model 512 is derived based on the down-sampled luma samples (514A-3 and 514B-3) and chroma samples (516A-3 and 516B-3).

Alternatively, in some embodiments, the video codec searches a group of down-sampled luma samples (e.g., the selected group of down-sampled luma samples 514) to identify a predefined number (e.g., two) of down-sampled luma samples having the largest luma values (e.g., 514A-4 and 514A-5) and a predefined number (e.g., two) of down-sampled luma samples having the smallest luma values (e.g., 514B-4 and 514B-5). The video codec then identifies chroma samples (e.g., 516A-4, 516A-5, 516B-4, and 516B-5) in the selected group of chroma samples 516, each corresponding to a respective one of the group of maximum down-sampled luma samples 514A-4 and 514A-5 and the group of minimum down-sampled luma samples 514B-4 and 514B-5, respectively. The video codec then performs a weighted average of values (e.g., chroma or luma values) within each of the identified groups of chroma and luma samples to generate a maximum averaged chroma value (e.g., of the chroma samples 516A-4 and 516A-5), a minimum averaged chroma value (e.g., of the chroma samples 516B-4 and 516B-5), a maximum averaged down-sampled luma value (e.g., of the luma samples 514A-4 and 514A-5), and a minimum averaged down-sampled luma value (e.g., of the luma samples 514B-4 and 514B-5). As such, the linear mapping model 512 can be derived based on the down-sampled luma samples (514A-4, 514-A-5, 514B-4 and 514B-5) and chroma samples (516A-4, 516A-5, 516B-4 and 516B-5).

Additionally, in some embodiments, the linear mapping model 512 is derived by creating a linear fitting curve for a plurality of down-sampled luma samples (e.g., in the selected group of down-sampled luma samples 514) and a plurality of corresponding chroma samples (e.g., in the selected group of chroma samples 516). Such curve fitting has a deviation error that optionally satisfies an error tolerance. The plurality of down-sampled luma samples includes a predefined number (e.g., greater than 10) of down-sampled luma samples corresponding to the predefined number of chroma samples. In some embodiments, the down-sampled luma samples are randomly selected from the group of neighboring down-sampled luma samples 514 for the purposes of deriving the linear mapping model 512.

FIG. 6A-6D is four example coding blocks 506A-506D each of which includes a plurality of luma samples 504 to be converted a plurality of chroma samples 502, in accordance with some embodiments. Each cross ("x") represents a location of a luma sample 504, and each circle ("o") represents a location of a chroma sample 502 or a down-sampled luma sample 508. Each circled cross ("⊗") represents a location where the chroma sample 502, luma sample 504, and down-sampled luma sample 508 overlap. Each coding block 506 is marked with a block boundary 602. Each coding block 506 complies with a respective subsampling scheme of the luma and chroma components (Y':Cb:Cr), and adopts a respective luma interpolation scheme 510 to down-sample the luma samples 504 of the respective coding block 506 to corresponding down-sampled luma samples 508.

In some embodiments of this application, for each coding block 506, all down-sampled luma sample 508 are derived from the neighboring luma samples 504 located in the same respective coding block 506 using the luma interpolation scheme 510, particularly when the down-sampled luma sample 508 is immediately adjacent to the block boundary 602. Each and every down-sampled luma sample 508 always overlaps a corresponding chroma samples 502, which can therefore be derived from the down-sampled luma sample 508 based on a linear mapping model 512.

In some embodiments, a cross-component filter model 520 is a combination of the luma interpolation scheme 510 and the linear mapping model 512. Given the two linear coefficients $\alpha$ and $\beta$ of the linear mapping model 512 and the filter coefficients f(i) of the luma interpolation scheme 510 for each coding block 506, the chroma samples 502 of the coding block 506 are directly derived from the luma samples 504 located in the same respective coding block 506 using the cross-component filter model 520, particularly when the down-sampled luma sample 508 is immediately adjacent to the block boundary 602.

In some embodiments, the coding block 506 is the first coding block of a video frame, and no other coding block 506 has been reconstructed prior to this coding block 506. Such a coding block 506 is optionally located at atop left corner of the video frame. The linear mapping model 512 is determined independently of the coding blocks in the video frame (e.g., based on a previous video frame). Alternatively, in some embodiments, the coding block 506 is not the first coding block of the video frame, and one or more other coding block 506 has been reconstructed prior to this coding block 506. For example, the coding block 506 is located in the middle of the video frame, and coding blocks immediately above or to the left of the coding block 506 have been processed and can be used to determine the linear mapping model 512 or reconstruct the luma or chroma samples in this coding block 506. In some situation, the coding block 506 is located next to a top boundary of the video frame, and at least one coding block immediately to the left of the coding block 506 has been processed and can be used to determine the linear mapping model 512 or reconstruct the luma or chroma samples in this coding block 506. In some situations, the coding block 506 is located next to a left boundary of the video frame, and at least one coding block immediately above the coding block 506 has been processed and can be used to determine the linear mapping model 512 or reconstruct the luma or chroma samples in this coding block 506. Regardless of the location of the coding block 506, coding blocks that are to the right or below the coding block 506 have not been processed and cannot be used to determine the linear mapping model 512 for this coding block 506 or reconstruct the luma or chroma samples in this coding block 506.

In some embodiments, the same predefined luma interpolation scheme 510 or cross-component filter model 520 is applied to generate all down-sampled luma samples 508 or chroma samples 502 across the entire coding block 506, respectively. Alternatively, in some embodiments, the predefined luma interpolation scheme 510 varies with a location of the down-sampled luma sample 508 or a location of a boundary pixel associated with the down-sampled luma sample 508. Likewise, in some embodiments, the cross-component filter model 520 varies with a location of the chroma sample 502 or a location of a boundary pixel associated with the chroma sample 502. For example, each of the predefined luma interpolation scheme 510 and cross-component filter model 520 corresponds to one of cross, block, or T-shape filter configurations.

Figure 6A:
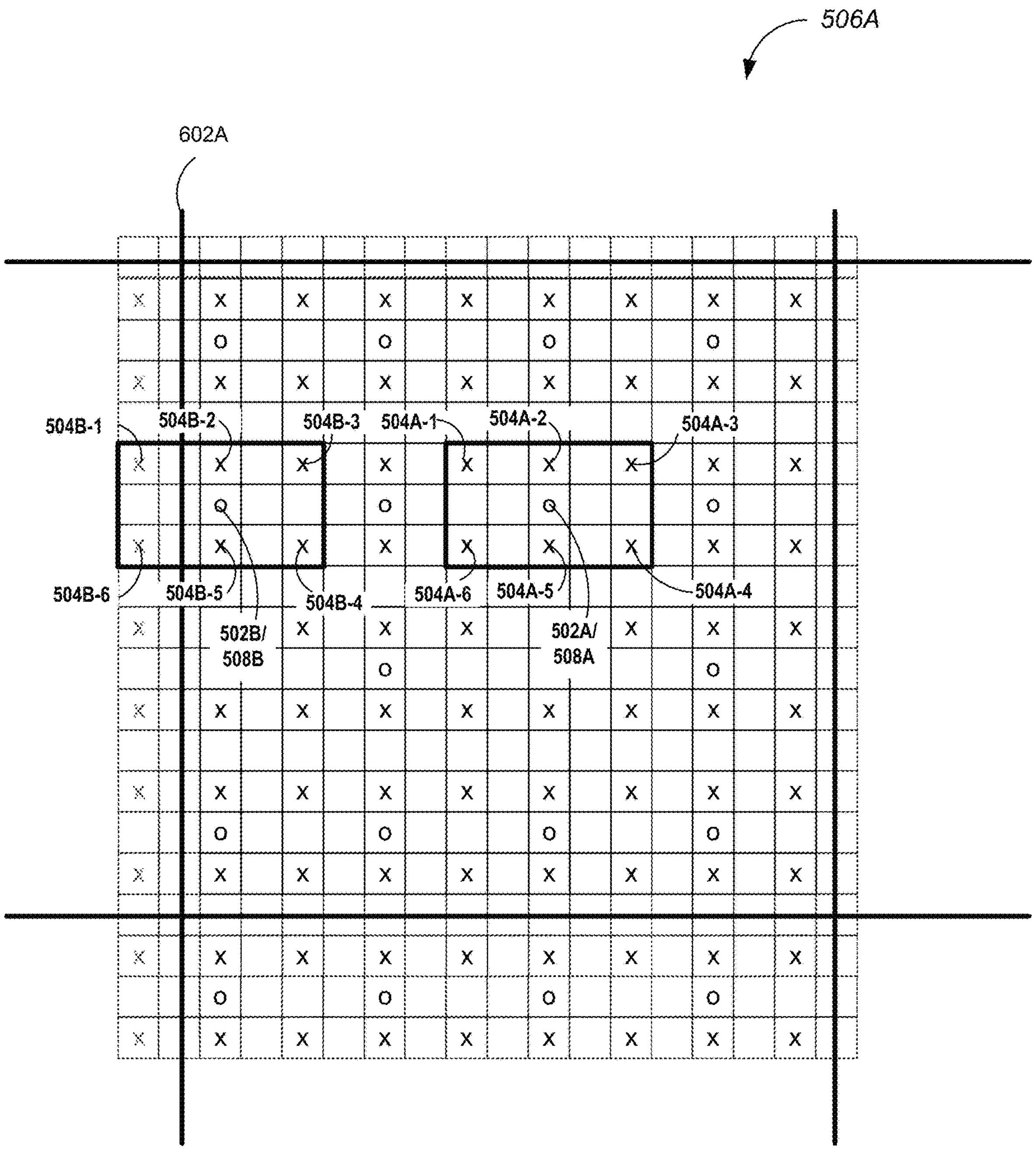
FIG. 6A-6D is four example coding blocks each of which includes a plurality of luma samples to be converted a plurality of chroma samples, in accordance with some embodiments.

Referring to FIG. 6A, the coding block 506A is obtained with a bitstream and includes a plurality of luma samples 504 that have been reconstructed from the bitstream. A plurality of corresponding chroma samples 502 are derived from the plurality of luma samples 504. In the coding block 506A, the subsampling scheme of the luma and chroma components 504 and 502 (Y':Cb:Cr) has a three-part ratio of 4:2:0. Each chroma sample 502 is combined from six neighbouring luma samples 504 according to a cross-component filter model 520. The six neighboring luma samples 504 are located at a top left corner of, directly above, at a top right corner of, at a bottom left corner of, directly below, and at a bottom right corner of the respective chroma sample 502. Stated another way, the six neighboring luma samples 504 of each chroma sample 502 are converted to a down-sampled luma sample 508 that overlaps the respective chroma sample 502 according to the predefined luma interpolation scheme 510, and then converted to the respective chroma sample 502 according to the linear mapping model 512. In an example, a first chroma sample 502A and its corresponding six neighboring luma sample 504A-1 to 504A-6 are entirely enclosed within the block boundary 602, and the first chroma sample 502A can be derived from the neighboring luma samples 504A-1 to 504A-6 based on a cross-component filter model 520 or a combination of the luma interpolation scheme 510 and linear mapping model 512.

Conversely, a second chroma sample 502B is immediately adjacent to a left block boundary 602A of the coding block 506A and corresponds to six neighboring luma sample 504B-1 to 504B-6 according to the cross-component filter model 520. In some situations, the left block boundary 602A of the coding block 506 overlaps a left boundary of the video frame, and two neighboring luma sample 504B-1 and 504B-6 are not available within this or any other coding block. The luma samples 504B-1 and 504B-6, which are external to the coding block 506 and not available, can be duplicated from the luma samples 504B-2 and 504B-5 that are immediately adjacent to the luma samples 504B-1 and 504B-6, respectively. In an example, the luma samples 504B-1 and 504B-6 are duplicated from 504B-4 and 504B-3 that are symmetric to the luma samples 504B-1 and 504B-6 with respect to the chroma sample 502B. Alternatively, in some situations, the left block boundary 602A of the coding block 506 does not overlap the left boundary of the video frame. The two neighboring luma sample 504B-1 and 504B-6 are not available within the coding block 506 itself, and however, may be provided by another neighboring coding block that has been reconstructed prior to the coding block 506. The luma samples 504B-1 and 504B-6 that are external to the coding block 506 may still be duplicated from the luma samples 504B-2 to 504B-5 within the coding block 506, without resorting to loading the luma samples 504B-1 and 504B-6 from any other coding blocks. By these means, the second chroma sample 502B and/or second luma sample 508B are further derived from the neighboring luma samples 504B-1 to 504B-6 in which the two luma samples 504B-1 and 504B-6 are optionally assigned from two distinct luma samples (e.g., 504B-2 and 504B-5) included in the coding block 506A.

Stated another way, when a bitstream is obtained where a plurality of luma samples for a plurality of pixels in a video frame can be derived, the plurality of pixels belong to a coding block 506A and includes a boundary pixel located inside the coding block 506 and immediately adjacent to a boundary 602 of the coding block 506A. The boundary pixel (e.g., corresponding to the luma sample 504B-2) corresponds to one or more neighboring pixels (e.g., corresponding to the luma sample 504B-1) that are not available. Each of the one or more neighboring pixels is outside the coding block 506A. In some embodiments, the one or more neighboring pixels of the boundary pixel are external to the video frame or an image slice. In some embodiments, the one or more neighboring pixels of the boundary pixel has not been coded yet and will be coded subsequently to the coding block 506. In some embodiments, the cross-component filter model 520 is limited to the coding block 506, and any neighboring pixels external to the coding block 506 are regarded as not available. The luma samples 504B-2 and 504B-5 corresponding to the boundary pixel are assigned to the luma samples 504B-1 and 504B-6 corresponding to each of the one or more neighboring pixels, respectively. A boundary luma sample 508B is determined based, at least, on the luma samples 504B-1 to 504B-6 of the one or more neighboring pixels and the boundary pixel according to the predefined luma interpolation scheme 510, and used to determine a boundary chroma sample 502B according to the linear mapping model 512. Alternatively, the boundary chroma sample 502B is determined from the luma samples 504B-1 to 504B-6 of the one or more neighboring pixels and the boundary pixel according to the cross-component filter model 520.

Figure 6B:
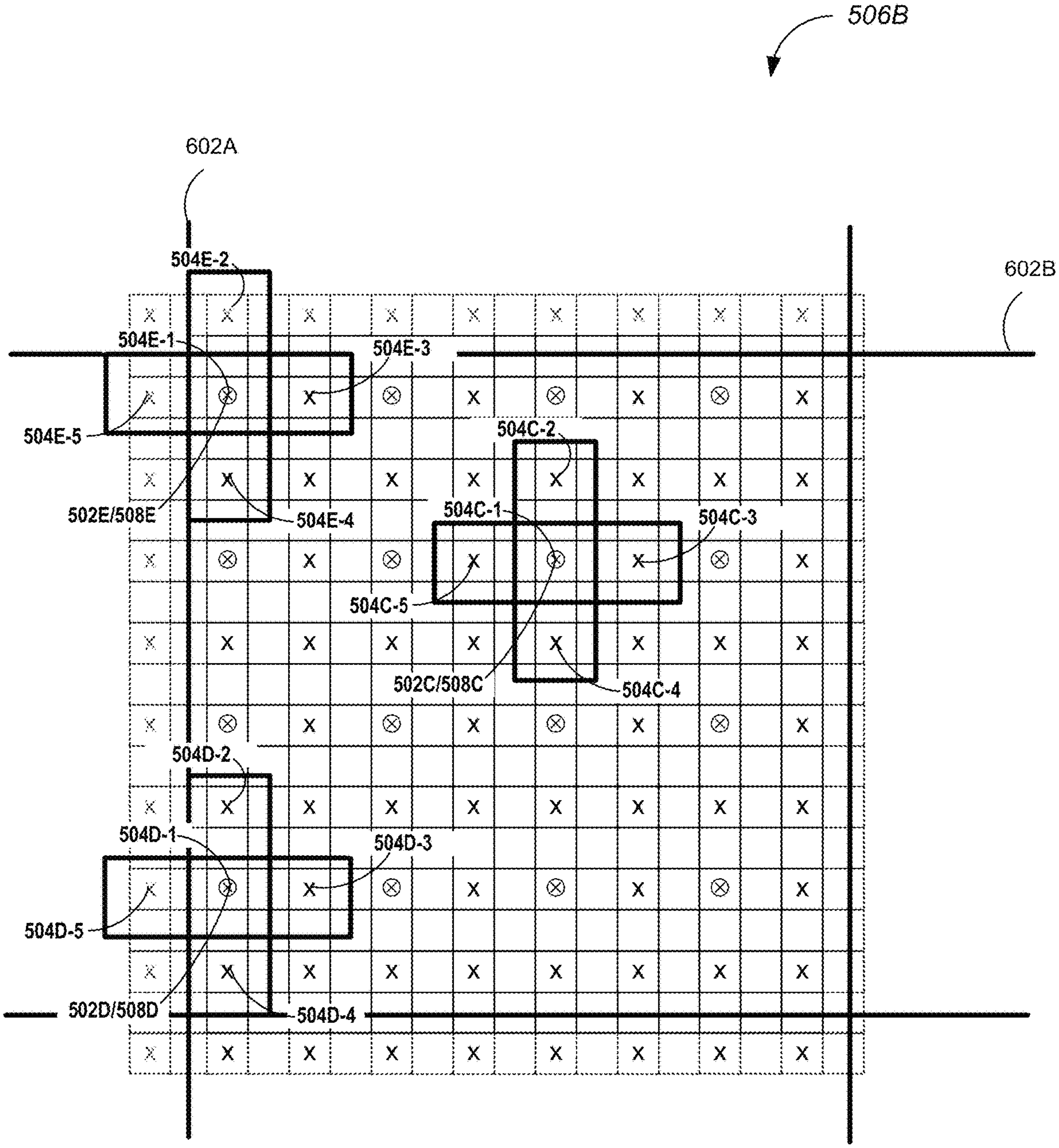

Referring to FIG. 6B, in the coding block 506B, the subsampling scheme of the luma and chroma components 504 and 502 (Y':Cb:Cr) has a three-part ratio of 4:2:0. Each chroma sample 502 is combined from five neighbouring luma samples 504 according to a cross-component filter model 520 having a cross filter shape. One of the five neighboring luma samples 504 overlaps the chroma sample 502, while the remainder four neighboring luma samples 504 are located directly above, below, to the left of, and to the right of the respective chroma sample 502. Stated another way, the five neighboring luma samples 504 of each chroma sample 502 are converted to a down-sampled luma sample 508 that overlaps the respective chroma sample 502 according to the predefined luma interpolation scheme 510, and then converted to the respective chroma sample 502 according to the linear mapping model 512. In an example, a third chroma sample 502C and its corresponding five neighboring luma sample 504C-1 to 504C-5 are entirely enclosed within the block boundary 602, and the third chroma sample 502C can be derived from the neighboring luma samples 504C-1 to 504C-5 based on a cross-component filter model 520 or a combination of the luma interpolation scheme 510 and linear mapping model 512.

A fourth chroma sample 502D is immediately adjacent to a left block boundary 602A of the coding block 506B and corresponds to five neighboring luma sample 504D-1 to 504D-5 according to the cross-component filter model 520. In some situations, the left block boundary 602A of the coding block 506B overlaps the left boundary of the video frame, and a neighboring luma sample 504D-5 is not available within this or any other coding block. The luma sample 504D-5 is duplicated from the luma sample 504D-1 that is immediately adjacent to the luma sample 504D-5 or from the luma sample 504D-3 that is symmetric with the luma sample 504D-5 with respect to a center luma sample 504D-1. In some situations, the left block boundary 602A of the coding block 506 does not overlap the left boundary of the video frame. The neighboring luma sample 504D-5 is not available within the coding block 506 itself, and however, may be provided by another neighboring coding block that has been reconstructed prior to the coding block 506B. The luma sample 504D-5 that is external to the coding block 506 may still be duplicated from the luma sample 504D-1 or 504D-3 located within the coding block 506, without resorting to loading the luma sample 504D-5 from any other coding blocks. By these means, the fourth chroma sample 502D and/or fourth luma sample 508D are derived from the neighboring luma samples 504D-1 to 504D-5 in which the luma sample 504D-5 is optionally assigned based on the luma samples 504D-1 or 504D-3 within the coding block 506B.

A fifth chroma sample 502E is immediately adjacent to both the left block boundary 602A and a top block boundary 602B of the coding block 506B, and corresponds to five neighboring luma sample 504E-1 to 504E-5 according to the cross-component filter model 520. In some embodiments, the coding block 506B is the first coding block in the video frame, and two neighboring luma samples 504E-2 and 504E-5 are not available within this or any other coding block. The luma samples 504E-2 and 504E-5 are duplicated from the luma sample 504E-1. In some situations, the coding block 506B is not located at a left top corner of the video frame, and its left and top neighboring coding blocks are available. The neighboring luma samples 504E-2 and 504E-5 are not available within the coding block 506 itself, and however, may be provided by another neighboring coding blocks that have been reconstructed prior to the coding block 506. Alternatively, the luma samples 504E-2 and 504E-5 may still be duplicated from the luma sample 504E-1 located within the coding block 506, without resorting to loading the luma samples from any other coding blocks. By these means, the fifth chroma sample 502E and/or fifth luma sample 508E are derived from the neighboring luma samples 504E-1 to 504E-5 in which the luma samples 504E-2 and 504E-5 are optionally assigned based on another luma sample 504E-1 located adjacent to the block boundary 602 of the coding block 506B.

Figure 6C:
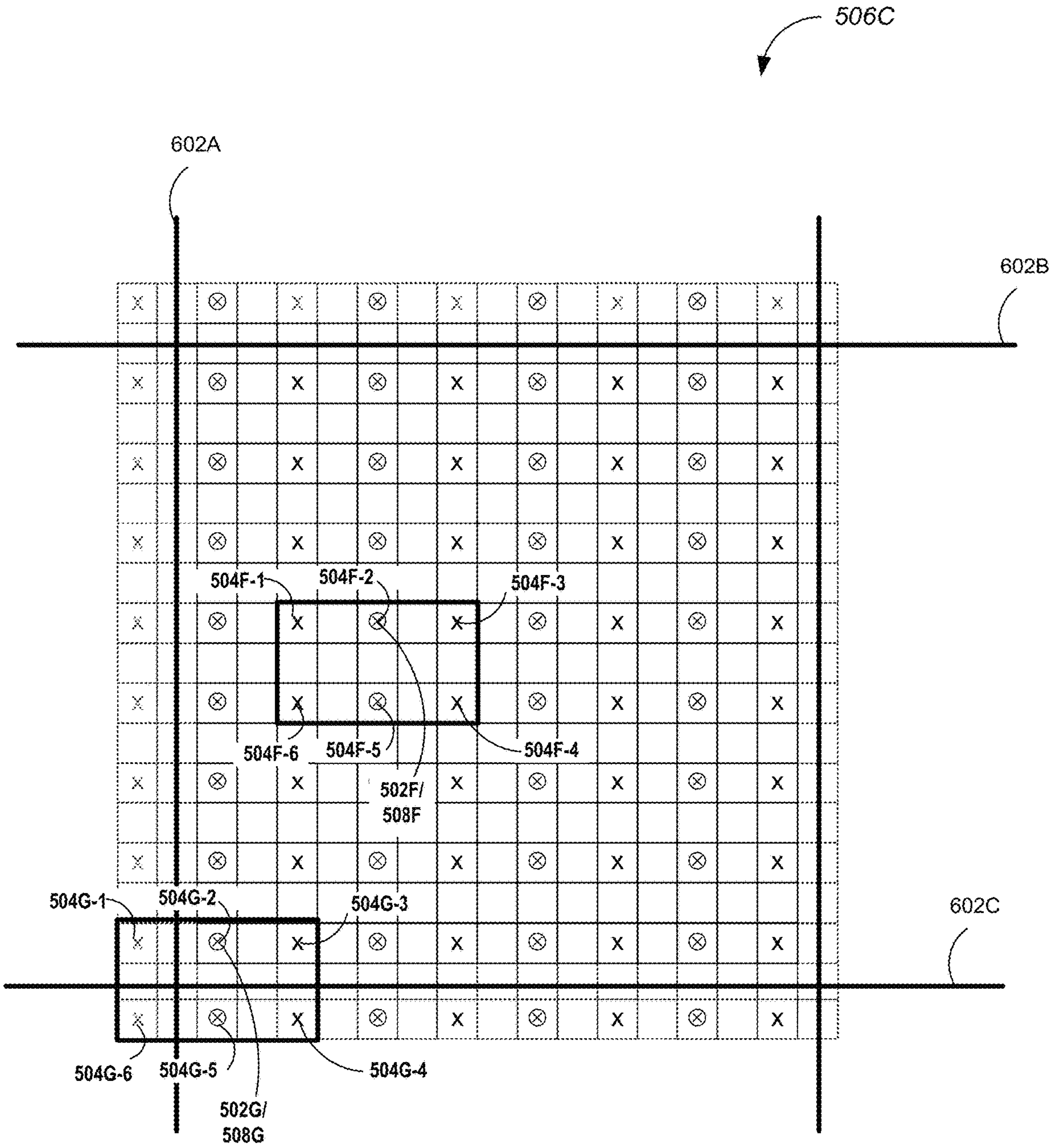

Referring to FIG. 6C, in the coding block 506C, the subsampling scheme of the luma and chroma components 504 and 502 (Y':Cb:Cr) has a three-part ratio of 4:2:2. Each chroma sample 502 is combined from six neighbouring luma samples 504 according to a cross-component filter model 520 having a 2×3 filter shape. One of the six neighboring luma samples 504 overlaps the chroma sample 502, while the remainder five neighboring luma samples are located to the left of, to the right of, at a left bottom corner of, directly below, and at a right bottom of the respective chroma sample 502. These six neighboring luma samples 504 of each chroma sample 502 are converted to a down-sampled luma sample 508 that overlaps the respective chroma sample 502 according to the predefined luma interpolation scheme 510, and then converted to the respective chroma sample 502 according to the linear mapping model 512. In an example, a sixth chroma sample 502F and its corresponding six neighboring luma sample 504F-1 to 504F-6 are entirely enclosed within the block boundary 602, and the sixth chroma sample 502F can be derived from the neighboring luma samples 504F-1 to 504F-6 based on a cross-component filter model 520 or a combination of the luma interpolation scheme 510 and linear mapping model 512.

A seventh chroma sample 502G is immediately adjacent to both the left block boundary 602A and a bottom block boundary 602C of the coding block 506C, and corresponds to six neighboring luma sample 504G-1 to 504G-6 according to the cross-component filter model 520. In some embodiments, the coding block 506C is located at a left bottom corner of the video frame, and the left and bottom block boundaries 602A and 602C overlap with a left block boundary and a bottom block boundary of the video frame. In some embodiments, the coding block 506C is located next to a left boundary of the video frame, so the luma sample 504G-1 and 504G-6 do not exist and the luma samples 504G-4 and 504G-5 have not been coded yet. At the left bottom corner or the left boundary of the video frame, four neighboring luma samples 504G-1, 504G-4, 504G-5 and 504G-6 are not available within this or any other coding block. Each of these luma samples is duplicated from the luma sample 504G-2 or 504G-3, e.g., the luma sample 504G-4 is duplicated from the luma sample 504G-3 and the luma samples 504G-1, 504G-5 and 504G-6 are duplicated from the luma sample 504G-2. In an example, the luma sample 504G-4 is duplicated from the luma sample 504G-3 and the luma samples 504G-1 and 504G-5 are duplicated from the luma sample 504G-2, and 504G-6 is duplicated from the luma sample 504G-1 or 504G-5 thereafter. In some situations, the coding block 506C is not located at the left bottom corner of the video frame, and its left and bottom neighboring coding blocks are available. The neighboring luma samples 504G-1, 504G-4, 504G-5 and 504G-6 are not available within the coding block 506 itself, and however, may be provided by another neighboring coding block that has been reconstructed prior to the coding block 506. Alternatively, the luma samples 504G-1, 504G-4, 504G-5 and 504G-6 may still be duplicated from the luma sample 504G-2 and 504G-3 located within the coding block 506, without resorting to loading the luma samples from any other coding blocks. By these means, the seventh chroma sample 502G and/or seventh luma sample 508G are derived from the neighboring luma samples 504G-1 to 504G-6 in which the luma samples 504G-1, 504G-4, 504G-5 and 504G-6 are optionally assigned based on another two luma samples 504G-2 and 504G-3 located adjacent to the block boundary 602 of the coding block 506C.

Figure 6D:
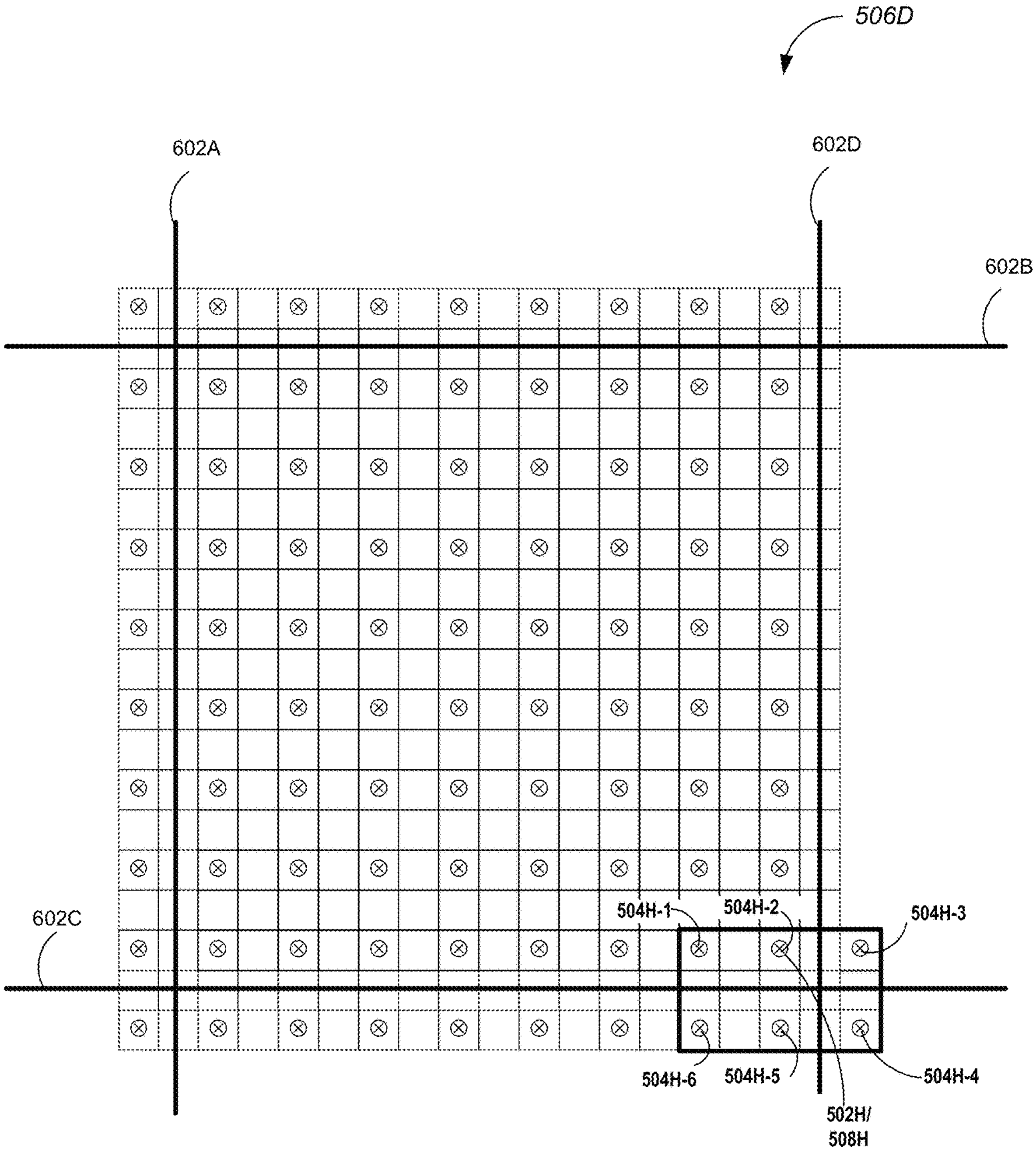

Referring to FIG. 6D, in the coding block 506D, the subsampling scheme of the luma and chroma components 504 and 502 (Y':Cb:Cr) has a three-part ratio of 4:4:4. Each chroma sample 502 is combined from six neighbouring luma samples 504 according to a cross-component filter model 520 having a 2×3 filter shape. One of the six neighboring luma samples 504 overlaps the chroma sample 502, while the remainder five neighboring luma samples are located to the left of, to the right of, at a left bottom corner of, directly below, and at a right bottom corner of the respective chroma sample 502. These six neighboring luma samples 504 of each chroma sample 502 are converted to a down-sampled luma sample 508 that overlaps the respective chroma sample 502 according to the predefined luma interpolation scheme 510, and then converted to the respective chroma sample 502 according to the linear mapping model 512.

An eighth chroma sample 502H is immediately adjacent to both the bottom block boundary 602C and a right block boundary 602D of the coding block 506D, and corresponds to six neighboring luma sample 504H-1 to 504H-6 according to the cross-component filter model 520. In some embodiments, the coding block 506D is located at a right bottom corner of the video frame, and the right and bottom block boundaries 602D and 602C overlap with a right block boundary and a bottom block boundary of the video frame. Four neighboring luma samples 504H-3 to 504H-6 are not available within this or any other coding block. Alternatively, in some situations, the coding block 506D is not located at the left bottom corner of the video frame, and its right and bottom neighboring coding blocks are still not available because these coding blocks have not been reconstructed yet. Each of these luma samples 504H-3 to 504H-6 is duplicated from the luma sample 504H-1 or 504H-2, e.g., the luma sample 504H-6 is duplicated from the luma sample 504H-1 and the luma samples 504H-3 to 504H-5 are duplicated from the luma sample 504H-2. In an example, the luma sample 504H-6 is duplicated from the luma sample 504H-1 and the luma samples 504H-3 and 504H-5 are duplicated from the luma sample 504H-2, and the luma sample 504H-4 is duplicated from the luma sample 504H-5 or 504H-3 thereafter. By these means, the eighth chroma sample 502H and/or eighth luma sample 508H are derived from the neighboring luma samples 504H-1 to 504H-6 in which the luma samples 504H-3 to 504H-6 are optionally assigned based on another two luma samples 504H-1 and 504H-2 located adjacent to the block boundary 602 of the coding block 506D.

According to an embodiment of this disclosure, samples padding is applied to the luma samples to generate those unavailable samples used by the down-sampling process. With the padding process, the same filter can be used to generate the down-sampled luma samples regardless its position. It is noted that various padding methods can be used such as repetitive padding or mirror padding. The most straight forward padding is the repetitive padding which directly use the nearest available sample values as the values of those samples to be padded.

Figure 6E:
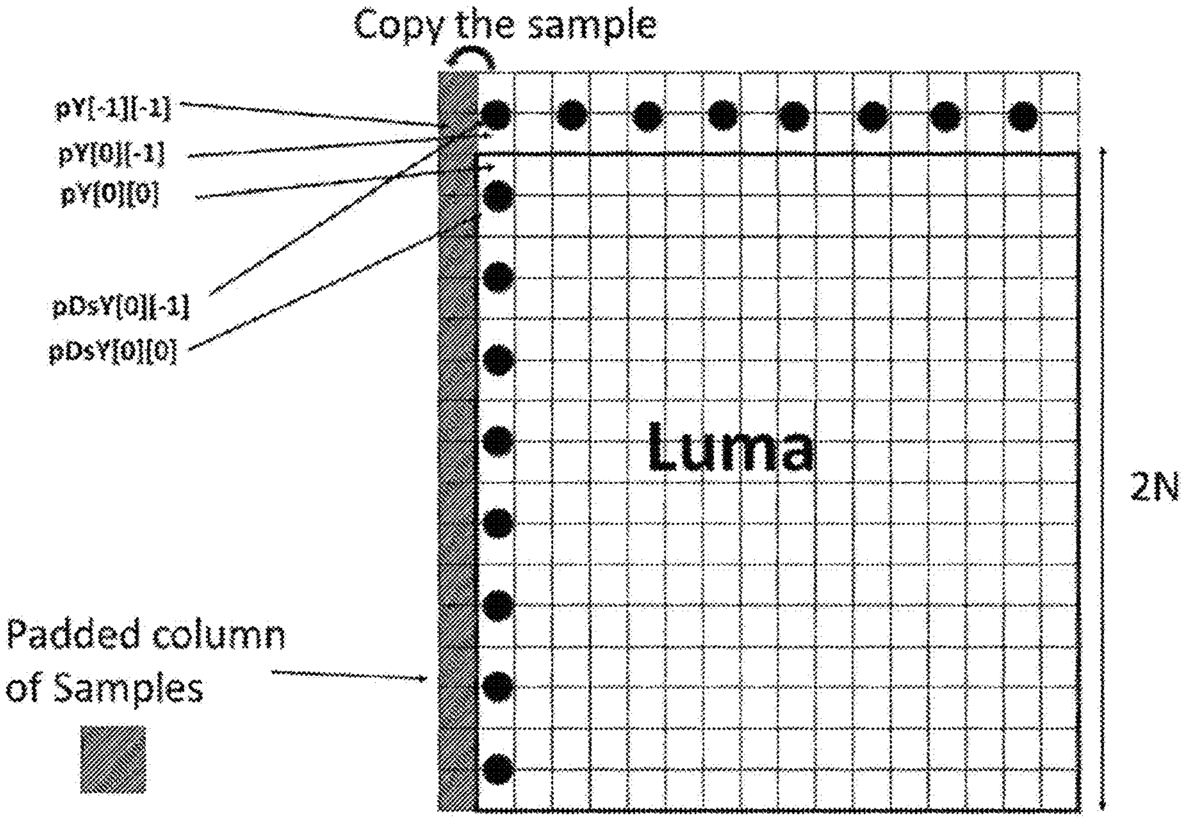
FIG. 6E illustrates an example sample padding scheme, in accordance with some embodiments.

Referring to FIG. 6E, each of the reference luma samples pY[−1,−1], pY[−1,0], . . . pY[−1, 2N−1], if not available, is duplicated from luma samples pY[0,−1], pY[0,0], . . . pY[0, 2N−1] respectively. It is noted that samples to be duplicated from may not necessarily be the one inside the current coding block, such as pY[0,−1]. As pY[0,−1] is regarded as not available, it is duplicated from luma sample pY[0,0]. The two-dimensional arrays pY[x][y] represent the luma samples. Please be noted that neighboring pixels not only includes the ones that are on an opposite side of a boundary with respect to the boundary pixel, but also the neighboring pixel that opposes the boundary pixel over the corner of the coding block. With the padded samples, the 6-taps down-sampling filter can be applied to generate the down-sampled samples pDsY[M][N]. With the proposed scheme, all the down-sampling filters used to generate all the down-sampled samples can be the same.

Below shows embodiments of complete processes to derive the down-sampled luma samples according to the present disclosure on top of the VVC specification. The one-dimensional array pSelDsY[N] is the selected down-sample luma samples from the left and above neighboring reconstructed luma samples. The process to derive the down-sampled luma samples in according to the present disclosure is illustrated as follows. numSampL and numSampT used in the process represent the number of left and above down-sampled luma samples. The variable bCTUboundary is set to true when the above samples are in the upper CTU, otherwise it is set to false. availTL is set to true when top-left reconstructed luma samples are available, otherwise it is set to false.

It is also noted that pY[x][y] is a two-dimensional array representing the luma samples and the top-left sample of the luma block is denoted as pY[0][0] the bottom-right sample of the luma block is denoted as pY[nTbW*SubWidthC−1][nTbH*SubHeightC−1] where nTbW and nTbH are the width and height of the chroma block; the SubWidthC and SubHeightC are the sample ratio between luma samples and chroma samples regarding different chroma sampling format (e.g. 4:4:4, 4:2:2 or 4:2:0). p[x][y] is a two-dimensional array representing the neighboring chroma samples and the left neighboring samples are denoted as p[x][y], with x=−1, y=0..2*nTbH−1 while the top neighboring samples are denoted as p[x][y], with x=0..2*nTbW−1, y=−1.

The variable availL and availT represent whether the associated neighbouring chroma samples are available or not. And the variable availTL is derived as (availL && availT).

On top of the VVC specification, one example of the luma sample padding which uses repetitive padding for the Cross-component Linear Model (CCLM) is illustrated below, wherein the parameters and function numbers corresponds to those in the VVC specification:

The variable cntN and array pickPosN with N being replaced by L and T, are derived as follows:
- The variable numIs4N is derived as follows:
numIs4N = ( ( availT & & availL && predModeIntra = = INTRA_LT_CCLM ) ? 0 : 1) (353)
- The variable startPosN is set equal to numSampN >> (2 + numIs4N ).
- The variable pickStepN is set equal to Max( 1, numSampN >> (1 + numIs4N ) ).
- If availN is equal to TRUE and predModeIntra is equal to INTRA_LT_CCLM or INTRA_N_CCLM, the following assignments are made:
- cntN is set equal to Min( numSampN, ( 1 + numIs4N ) << 1).
- pickPosN[ pos ] is set equal to (startPosN + pos * pickStepN), with pos = 0..cntN − 1.
- Otherwise, cntN is set equal to 0.

When numSampL is greater than 0, the selected neighbouring left chroma samples pSelC[ idx ] are set equal to p[ −1 ][ pickPosL[ idx ] ] with idx = 0..cntL − 1, and the selected down−sampled neighbouring left luma samples pSelDsY[ idx ] with idx = 0..cntL − 1 are derived as follows:
- The variable y is set equal to pickPosL[ idx ].
- If both SubWidthC and SubHeightC are equal to 1, the following applies:
pSelDsY[ idx ] = pY[ − 1][ y ] (377)
- Otherwise the following applies:
- If sps_chroma_vertical_collocated_flag is equal to 1, the following applies:
- If y is greater than 0 or availTL is equal to TRUE, pSelDsY[ idx ] is derived as follows:

pSelDsY[ idx ] = ( F3[ 1 ][ 0 ] * pY[ − SubWidthC ][ SubHeightC * y − 1 ] +
F3[ 0 ][ 1 ] * pY[ −1 − SubWidthC ][ SubHeightC * y ] +
F3[ 1 ][ 1 ] * pY[ −SubWidthC ][ SubHeightC * y ] + (378)
F3[ 2 ][ 1 ] * pY[ 1 − SubWidthC ][ SubHeightC * y ] +
F3[ 1 ][ 2 ] * pY[ −SubWidthC ][ SubHeightC * y + 1 ] + 4 ) >> 3

- Otherwise (y is equal to 0), pSelDsY[ idx ] is derived as follows:

-continued pSelDsY[ idx ] = ( F3[ 1 ][ 0 ] * pY[ − SubWidthC ][ 0 ] +
F3[ 0 ][ 1 ] * pY[ −1 − SubWidthC ][ 0 ] +
F3[ 1 ][ 1 ] * pY[ −SubWidthC ][ 0 ] + (378)
F3[ 2 ][ 1 ] * pY[ 1 − SubWidthC ][ 0 ] +
F3[ 1 ][ 2 ]*pY[−SubWidthC][ 1 ] + 4 ) >> 3

- Otherwise (sps_chroma_vertical_collocated_flag is equal to 0), the following applies:

pSelDsY[ idx ] = ( F4[ 0 ][ 1 ] * pY[ −1 − SubWidthC ][ SubHeightC * y ] +
F4[ 0 ][ 2 ] * pY[ −1 − SubWidthC ][ SubHeightC * y + 1 ] +
F4[ 1 ][ 1 ] * pY[ −SubWidthC ][ SubHeightC * y ] + (380)
F4[ 1 ][ 2 ] * pY[ −SubWidthC ][ SubHeightC * y + 1 ] +
F4[ 2 ][ 1 ] * pY[ 1 − SubWidthC ][ SubHeightC * y ] +
F4[ 2 ][ 2 ] * pY[ 1 − SubWidthC][ SubHeightC * y + 1 ] + 4 ) >> 3

When numSampT is greater than 0, the selected neighbouring top chroma samples pSelC[ idx ] are set equal to p[ pickPosT[ idx − cntL ] ][ −1 ] with idx = cntL..cntL + cntT − 1, and the down-sampled neighbouring top luma samples pSelDsY[ idx ] with idx = 0..cntL + cntT − 1 are specified as follows:

- The variable x is set equal to pickPosT[ idx − cntL ].
- If both SubWidthC and SubHeightC are equal to 1, the following applies:

pSelDsY[ idx ] = pY[ x ][ − 1] (381)

- Otherwise, the following applies:
- If sps_chroma_vertical_collocated_flag is equal to 1, the following applies:
- If x is greater than 0, the following applies:
- If bCTUboundary is equal to FALSE, the following applies:

pSelDsY[ idx ] = ( F3[ 1 ][ 0 ] * pY[ SubWidthC * x ][ − 1 − SubHeightC ] +
F3[ 0 ][ 1 ] * pY[ SubWidthC * x − 1 ][ −SubHeightC ] +
F3[ 1 ][ 1 ] * pY[ SubWidthC * x ][ −SubHeightC ] + (382)
F3[ 2 ][ 1 ] * pY[ SubWidthC * x + 1 ][ −SubHeightC ] +
F3[ 1 ][ 2 ] * pY[ SubWidthC *x ][ 1 − SubHeightC ] + 4 ) >> 3

- Otherwise (bCTUboundary is equal to TRUE), the following applies:

pSelDsY[ idx ] = ( F2[ 0 ] * pY[ SubWidthC * x − 1 ][ −1 ] +
F2[ 1 ] * pY[ SubWidthC * x ][ −1 ] + (383)
F2[ 2 ]* pY[ SubWidthC * x + 1 ][ −1 ] + 2 ) >> 2

- Otherwise (x is equal to 0), the following applies:
- If availTL is equal to TRUE and bCTUboundary is equal to FALSE, the following applies:

pSelDsY[ idx ] = ( F3[ 1 ][ 0 ] * pY[ −1 ][ − 1 − SubHeightC ] +
F3[ 0 ][ 1 ] * pY[ −1 ][ −SubHeightC ] +
F3[ 1 ][ 1 ] * pY[ 0 ][ −SubHeightC ] + (384)
F3[ 2 ][ 1 ] * pY[ 1 ][ −SubHeightC ] +
F3[ 1 ][ 2 ] * pY[ −1 ][ 1 − SubHeightC ] + 4 ) >> 3

- Otherwise, if availTL is equal to TRUE and bCTUboundary is equal to TRUE, the following applies:

pSelDsY[ idx ] = ( F2[ 0 ] * pY[ −1 ][ −1 ] + F2[ 1 ] * pY[ 0 ][ −1 ] +
F2[ 2 ] * pY[ 1 ][ −1 ] + 2) >> 2 (385)

- Otherwise, if availTL is equal to FALSE and bCTUboundary is equal to FALSE, the following applies:

pSelDsY[ idx ] = ( F3[ 1 ][ 0 ] * pY[ 0 ][[ −3 ] +
F3[ 0 ][ 1 ] * pY[ 0 ][ −2 ] +
F3[ 1 ][ 1 ] * pY[ 0 ][ −2 ] + (384)
F3[ 2 ][ 1 ] * pY[ 1 ][ −2 ] +
F3[ 1 ][ 2 ]* pY[ 0 ][ 1 ] + 4 ) >> 3

- Otherwise (availTL is equal to FALSE and bCTUboundary is equal to TRUE), the following applies:

pSelDsY[ idx ] = pY[ 0 ][ −1 ] (387)

- Otherwise (sps_chroma_vertical_collocated_flag is equal to 0), the following applies:
- If x is greater than 0, the following applies:
- If bCTUboundary is equal to FALSE, the following applies:

pSelDsY[ idx ] = ( F4[ 0 ][ 1 ] * pY[ SubWidthC* x − 1 ][ −2 ] +
F4[ 0 ][ 2 ] * pY[ SubWidthC * x − 1 ][ −1 ] +
F4[ 1 ][ 1 ] * pY[ SubWidthC * x ][−2 ] + (388)
F4[ 1 ][ 2 ] * pY[ SubWidthC * x ][ −1 ] +
F4[ 2 ][ 1 ] * pY[ SubWidthC * x + 1 ][ −2 ] +
F4[ 2 ][ 2 ]*pY[ SubWidthC * x + 1 ][ −1 ] + 4 ) >> 3

- Otherwise (bCTUboundary is equal to TRUE), the following applies:

pSelDsY[ idx ] = ( F2[ 0 ] * pY[ SubWidthC * x − 1 ][ −1 ] +
F2[ 1 ] * pY[ SubWidthC * x ][ −1 ] + (389)
F2[ 2 ] * pY[ SubWidthC * x + 1 ][ −1 ] + 2 ) > 2

- Otherwise (x is equal to 0), the following applies:
- If availTL is equal to TRUE and bCTUboundary is equal to FALSE, the following applies:

pSelDsY[ idx ] = ( F4[ 0 ][ 1 ] * pY[ −1 ][ −2 ] + F4[ 0 ][ 2 ] * pY[ −1 ][ −1 ] +
F4[ 1 ][ 1 ] * pY[ 0 ][ −2 ] + F4[ 1 ][ 2 ] * pY[ 0 ][ −1 ] +
F4[ 2 ][ 1 ][ 1 ][ 2 ] + F4[ 2 ][ 2 ] * pY[ 1 ][ −1 ] + 4 ) >> 3

- Otherwise, if availTL is equal to TRUE and bCTUboundary is equal to TRUE, the following applies:

pSelDsY[ idx ] = (F2[ 0 ] * pY[ −1 ][ −1 ] + F2[ 1 ] * pY[ 0 ][ −1 ] +
F2[2] * pY[ 1 ][ −1 ] + 2 ) >> 2 (391)

- Otherwise, if availTL is equal to FALSE and bCTUboundary is equal to FALSE, the following applies:

pSelDsY[ idx ] = (F4[ 0 ][ 1 ] * pY[ 0 ][ −2 ] + F4[ 0 ][ 2 ] * pY[ 0 ][ −1 ] +
F4[ 1 ][ 1 ] * pY[ 0 ][ −2 ] + F4[ 1 ][ 2 ] * pY[ 0 ][ −1 ] +
F4[ 2 ][ 1 ] * pY[ 1 ][ −2 ] + F4[ 2 ][ 2 ] * pY[ 1 ][ −1 ] >> 3

- Otherwise (availTL is equal to FALSE and bCTUboundary is equal to TRUE), the following applies:

pSelDsY[ idx ] = F2[ 0 ] * pY[ 0 ][ −1 ] + F2[ 1 ] * pY[ 0 ][ −1 ] +
F2[ 2 ]*pY[ 1 ][ −1 ] + 2 ) >> 2.

On top of the VVC specification, another example of the luma sample padding which uses repetitive padding for the CCLM is illustrated below, wherein the parameters and function numbers still corresponds to those in the VVC specification:

---

The variable cntN and array pickPosN with N being replaced by L and T, are derived as follows:
- The variable numIs4N is derived as follows:

numIs4N = ( ( availT & & availL & & predMode Intra == INTRA LT CCLM ) ? 0 : 1) (353)

- The variable startPosN is set equal to numSampN >> (2 + numIs4N ).
- The variable pickStepN is set equal to Max( 1, numSampN >> ( 1 + numIs4N ) ).
- If availN is equal to TRUE and predModeIntra is equal to INTRA_LT_CCLM or INTRA_N_CCLM, the following assignments are made:
- cntN is set equal to Min( numSampN, ( 1 + numIs4N ) << 1 ).
- pickPosN[ pos ] is set equal to (startPosN + pos * pickStepN), with pos = 0..cntN − 1.
- Otherwise, cntN is set equal to 0.

When numSampT is greater than 0, the selected neighbouring top chroma samples pSelC[ idx ] are set equal to p[ pickPosT[ idx − cntL ] ][ −1 ] with idx = cntL..cntL + cntT − 1, and the down-sampled neighbouring top luma samples pSelDsY[ idx ] with idx = 0..cntL + cntT − 1 are specified as follows:
- The variable x is set equal to pickPosT[ idx − cntL ].
- If both SubWidthC and SubHeightC are equal to 1, the following applies:

pSelDsY[ idx ] = pY[ x ][ −1 ] (381)

- Otherwise, the following applies:
- If sps_chroma_vertical_collocated_flag is equal to 1, the following applies:
- If x is greater than 0, the following applies:
- If bCTUboundary is equal to FALSE, the following applies:

pSelDsY[ idx ] = (F3[ 1 ][ 0 ] * pY[ SubWidthC * x ][ − 1 − SubHeightC ] +
F3[ 0 ][ 1 ] * pY[ SubWidthC * x − 1 ][ −SubHeightC ] +
F3[ 1 ][ 1 ] * pY[ SubWidthC * x ][ −SubHeightC ] + (382)
F3[ 2 ][ 1 ] * pY[ SubWidthC * x + 1 ][ −SubHeightC ] +
F3[ 1 ][ 2 ] * pY[ SubWidthC *x ][ 1 − SubHeightC ] + 4 ) >> 3

- Otherwise (bCTUboundary is equal to TRUE), the following applies:

pSelDsY[ idx ] = ( F2[ 0 ] * pY[ SubWidthC * x − 1 ][ −1 ] +
F2[ 1 ] * pY[ SubWidthC * x ][ −1 ] + (383)
F2[ 2 ]* pY[ SubWidthC * x + 1 ][ −1 ] + 2 ) >> 2

- Otherwise (x is equal to 0), the following applies:
- If bCTUboundary is equal to FALSE, the following applies:

pSelDsY[ idx ] = ( F3[ 1 ][ 0 ] * pY[ 0 ][ − 1 − SubHeightC ] +
F3[ 0 ][ 1 ] * pY[ 0 ][ −SubHeightC ] +
F3[ 1 ][ 1 ] * pY[ 0 ][ −SubHeightC ] + (384)
F3[ 2 ][ 1 ] * pY[ 1 ][ −SubHeightC ] +
F3[ 1 ][ 2 ] * pY[ 1 ][ 1 − SubHeightC ] + 4) >> 3

- Otherwise, if bCTUboundary is equal to TRUE, the following applies:

pSelDsY[ idx ] = (F2[ 0 ] * pY[ 0 ][ −1 ] + F2[ 1 ] * pY[ 0 ][ −1 ] +
F2[ 2 ] * pY[ 1 ][ −1 ] + 2 ) >> 2 (385)

- Otherwise (sps_chroma_vertical_collocated_flag is equal to 0), the following applies:
- If x is greater than 0, the following applies:
- If bCTUboundary is equal to FALSE, the following applies:

pSelDsY[ idx ] = ( F4[ 0 ][ 1 ] * pY[ SubWidthC x − 1 ][ −2 ] +
F4[ 0 ][ 2 ] * pY[ SubWidthC * x − 1 ][ −1 ] +
F4[ 1 ][ 1 ] * pY[ SubWidthC * x ][ −2 ] + (388)
F4[ 1 ][ 2 ] * pY[ SubWidthC * x ][ −1 ] +
F4[ 2 ][ 1 ] * pY[ SubWidthC * x + 1 ][ −2 ] +
F4[ 2 ][ 2 ] * pY[ SubWidthC * x + 1 ][ −1 ] + 4 ) >> 3

- Otherwise (bCTUboundary is equal to TRUE), the following applies:

pSelDsY[ idx ] = ( F2[ 0 ] * pY[ SubWidthC * x − 1 ][ −1 ] +
F2[ 1 ] * pY[ SubWidthC * x ][ −1 ] +
F2[ 2 ] * pY[ SubWidthC * x + 1 ][ −1 ] + 2 ) >> 2

- Otherwise (x is equal to 0), the following applies:
- If bCTUboundary is equal to FALSE, the following applies:

pSelDsY[ idx ] = ( F4[ 0 ][ 1 ] * pY[ 0 ][ 2 ] + 4[ 0 ][ 2 ] * pY[ −1 ][ −1 ] +
F4[ 1 ][ 1 ] * pY[ 0 ][ −2 ] + F4[ 1 ][ −2 ] * pY [ 0 ][ −1 ] +
F4[ 2 ][ 1 ] * pY[ 1 ][ −2 ] + F4[ 2 ][ 2 ] * pY[ 1 ][ −1 ] + 4 ) >> 3

- Otherwise, if bCTUboundary is equal to TRUE, the following applies:

pSelDsY[ idx ] = ( F2[ 0 ] * pY[ 0 ][ −1 ] +
F2[ 1 ] * pY[ 0 ][ −1 ] +
F2[ 2 ] *pY[ 1 ][ −1 ] + 2 ) >> 2.

---

According to an embodiment of this disclosure, on top of the VVC specification, one example of the process to derive the down-sampled luma samples of the collocated luma block for the CCLM is illustrated below, wherein the parameters and function numbers corresponds to those in the VVC specification, for example, the two-dimensional arrays pDsY [x][y] are down-sample luma samples.

The down-sampled collocated luma samples pDsY[ x ][ y ] with x = 0..nTbW − 1, y = 0..nTbH − 1 are derived as follows:

- If both SubWidthC and SubHeightC are equal to 1, the following applies:
  - pDsY[ x ][ y ] with x = 1..nTbW − 1, y = 1..nTbH − 1 is derived as follows:

pDstY[ x ][ y ] = pY[ x ][ y ] (355)

- Otherwise, the following applies:
  - The one-dimensional filter coefficients array F1 and F2, and the 2-dimensional filter coefficients arrays F3 and F4 are specified as follows.

F1[ 0 ] = 2, F1[ 1 ] = 1 (356)
F2[ 0 ] = 1, F2[ 1 ] = 2, F2[ 2 ] = 1 (357)
F3[ i ] [j ] = F4[ i ][ j ] = 0, with i = 0..2, j = 0.2 (358)

- If both SubWidthC and SubHeightC are equal to 2, the following applies:

F1[ 0 ] = 1, F1[ 1 ] = 1 (359)
F3[ 0 ][ 1 ] = 1, F3[ 1 ][ 1 ] = 4, F3[ 2 ][ 1 ] = 1, F3[ 1 ][ 0 ] = 1, F3[ 1 ][ 2 ] = 1 (360)
F4[ 0 ][ 1 ] = 1, F4[ 1 ][ 1 ] = 2, F4[ 2 ][ 1 ] = 1 (361)
F4[ 0 ][ 2 ] = 1, F4[ 1 ][ 2 ] = 2, F4[ 2 ][ 2 ] = 1 (362)

- Otherwise, the following applies:

F3[ 1 ][ 1 ] = 8 (363)
F4[ 0 ][ 1 ] = 2, F4[ 1 ][ 1 ] = 4, F4[ 2 ][ 1 ] = 2, (364)

- If sps_chroma_vertical_collocated_flag is equal to 1, the following applies:
  - pDsY[ x ][ y ] with x = 1..nTbW − 1, y = 1..nTbH − 1 is derived as follows:

pDsY[ x ][ y ] = ( F3[ 1 ][ 0 ] * pY[ SubWidthC * x ][ SubHeightC * y − 1 ] +
F3[ 0 ][ 1 ] * pY[ SubWidthC * x − 1 ][ SubHeightC * y ] +
F3[ 1 ][ 1 ] * pY[ SubWidthC * x ][ SubHeightC * y ] + (365)
F3[ 2 ][ 1 ] * pY[ SubWidthC * x + 1 ][ SubHeightC * y ] +
F3[ 1 ][ 2 ] * pY[ SubWidthC * x ][ SubHeightC * y + 1 ] + 4) >> 3

- If availL is equal to TRUE, pDsY[ 0 ][ y ] with y = 1..nTbH − 1 is derived as follows:

pDsY[ 0 ][ y ] = ( F3[ 1 ][ 0 ] * pY[ 0 ][ SubHeightC * y − 1 ] +
F3[ 0 ][ 1 ] * pY[ − 1 ][ SubHeightC * y ] +
F3[ 1 ][ 1 ] * pY[ 0 ][ SubHeightC * y ] + (366)
F3[ 2 ][ 1 ] * pY[ 1 ][ SubHeightC * y ] +
F3[ 1 ][ 2 ] *pY[ 0 ][ SubHeightC * y + 1 ] + 4) >> 3

- Otherwise (availL is equal to FALSE), pDsY[ 0 ][ y ] with y = 1..nTbH − 1 is derived as follows:

pDsY[ 0 ][ y ] = ( F3[ 1 ][ 0 ] * pY[ 0 ][ SubHeightC * y − 1 ] +
F3[ 0 ][ 1 ] * pY[ 0 ][ SubHeightC * y ] +
F3[ 1 ][ 1 ] * pY[ 0 ][ SubHeightC * y ] + (366)
F3[ 2 ][ 1 ] * pY[ 1 ][ SubHeightC * y ] +
F3[ 1 ][ 2 ] * pY[ 0 ][ SubHeightC * y + 1 ] + 4 ) >> 3

- If availT is equal to TRUE, pDsY[ x ][ 0 ] with x = 1..nTbW − 1 is derived as follows:

pDsY[ x ][ 0 ] = ( F3[ 1 ][ 0 ] * pY[ SubWidthC * x ][ − 1 ] +
F3[ 0 ][ 1 ] * pY[ SubWidthC * x − 1 ][ 0 ] +
F3[ 1 ][ 1 ] * pY[ SubWidthC * x ][ 0 ] + (368)
F3[ 2 ][ 1 ] * pY[ SubWidthC * x + 1 ][ 0 ] +
F3[ 1 ][ 2 ] * pY[ SubWidthC * x ][ 1 ] + 4 ) >> 3

- Otherwise (availT is equal to FALSE), pDsY[ x ][ 0 ] with x = 1..nTbW − 1 is derived:

pDsY[ x ][ 0 ] = ( F3[ 1 ][ 0 ] * pY[ SubWidthC * x ][ 0 ] +
F3[ 0 ][ 1 ] * pY[ SubWidthC * x − 1 ][ 0 ]+
F3[ 1 ][ 1 ] * pY[ SubWidthC * x ][ 0 ] + (368)
F3[ 2 ][ 1 ] * pY[ SubWidthC * x + 1 ][ 0 ] +
F3[ 1 ][ 2 ] * pY[ SubWidthC * x ][ 1 ] + 4 ) >> 3

- If availL is equal to TRUE and availT is equal to TRUE, pDsY[ 0 ][ 0 ] is derived as follows:

pDsY[ 0 ][ 0 ] = ( F3[ 1 ][ 0 ] * pY [ 0 ][ − 1] +
F3[ 0 ][ 1 ] * pY[ − 1 ][ 0 ] +
F3[ 1 ][ 1 ] * pY[ 0 ][ 0 ] + (370)
F3[ 2 ][ 1 ] * pY[ 1 ][ 0 ] +
F3[ 1 ][ 2 ] * pY[ 0 ][ 1 ] + 4 ) >> 3

- Otherwise, if availL is equal to TRUE and availT is equal to FALSE, pDsY[ 0 ][ 0 ] is derived as follows:

pDsY[ 0 ][ 0 ] = ( F3[ 1 ][ 0 ] * pY [ 0 ][ 0 ] +
F3[ 0 ][ 1 ] * pY[ − 1 ][ 0 ] +
F3[ 1 ][ 1 ] * pY[ 0 ][ 0 ] + (370)
F3[ 2 ][ 1 ] * pY[ 1 ][ 0 ] +
F3[ 1 ][ 2 ] * pY[ 0 ][ 1 ] + 4 ) >> 3

- Otherwise, if availL is equal to FALSE and availT is equal to TRUE, pDsY[ 0 ][ 0 ] is derived as follows:

pDsY[ x ][ 0 ] = ( F3[ 1 ][ 0 ] * pY[ SubWidthC * x ][ −1 ] +
F3[ 0 ][ 1 ] * pY[ SubWidthC * x ][ 0 ] +
F3[ 1 ][ 1 ] * pY[ SubWidthC * x ][ 0 ] + (368)
F3[ 2 ][ 1 ] * pY[ SubWidthC * x + 1 ][ 0 ] +
F3[ 1 ][ 2 ] * pY[ SubWidthC * x][ 1 ] + 4 ) >> 3

- Otherwise (availL is equal to FALSE and availT is equal to FALSE), pDsY[ 0 ][ 0 ] is derived as follows:

pDsY[ x ][ 0 ] = ( F3[ 1 ][ 0 ] * pY[ SubWidthC * x ][ 0 ] +
F3[ 0 ][ 1 ] * pY[ SubWidthC * x ][ 0 ] +
F3[ 1 ][ 1 ] * pY[ SubWidthC * x ][ 0 ] + (368)
F3[ 2 ][ 1 ] * pY[ SubWidthC * x + 1 ][ 0 ] +
F3[ 1 ][ 2 ] * pY[ SubWidthC * x ][ 1 ] + 4 ) >> 3

- Otherwise (sps_chroma_vertical_collocated_flag is equal to 0), the following applies:

-continued

- pDsY[ x ][ y ] with x = 1..nTbW − 1, y = 0..nTbH − 1 is derived as follows:
pDsY[ x ][ y ] = ( F4[ 0 ][ 1 ] * pY[ SubWidthC * x − 1 ][ SubHeightC * y ] +
F4[ 0 ][ 2 ] * pY[ SubWidthC * x − 1 ][ SubHeightC * y + 1 ] +
F4[ 1 ][ 1] * pY[ SubWidthC * x ][ SubHeightC * y ] + (374)
F4[ 1 ][ 2 ] * pY[ SubWidthC * x ][ SubHeightC * y + 1 ] +
F4[ 2 ][ 1 ] * pY[ SubWidthC * x + 1 ][ SubHeightC * y ] +
F4[ 2 ][ 2 ] * pY[ SubWidthC * x + 1][ SubHeightC * y + 1 ] + 4 ) >> 3
- If availL is equal to TRUE, pDsY[ 0 ][ y ] with y = 0..nTbH − 1 is derived as follows:
pDsY[ 0 ][ y ] = ( F4[ 0 ][ 1 ] * pY[ − 1 ][ SubHeightC * y ] +
F4[ 0 ][ 2 ] * pY[ − 1 ][ SubHeightC * y + 1 ] +
F4[ 1 ][ 1 ] * pY[ 0 ][ SubHeightC * y ] + (375)
F4[ 1 ][ 2 ] * pY[ 0 ][ SubHeightC * y + 1 ] +
F4[ 2 ][ 1 ] * pY[ 1 ][ SubHeightC * y ] +
F4[ 2 ][ 2 ]* pY[ 1 ][ SubHeightC * y + 1 ] + 4 ) >> 3
- Otherwise (availL is equal to FALSE), pDsY[ 0 ][ y ] with y = 0..nTbH − 1 is derived as follows:
pDsY[ 0 ][ y ] = ( F4[ 0 ][ 1 ] * pY[ 0 ][ SubHeightC * y ] +
F4[ 0 ][ 2 ] * pY[ 0 ][ SubHeightC * y + 1 ] +
F4[ 1 ][ 1 ] * pY[ 0 ][ SubHeightC * y ] + (375)
F4[ 1 ][ 2 ] * pY[ 0 ][ SubHeightC * y + 1 ] +
F4[ 2 ][ 1 ] * pY[ 1 ]| SubHeightC * y ] +
F4[ 2 ][ 2 ] * pY[ 1 ][ SubHeightC * y + 1 ] + 4 ) >> 3.

On top of the VVC specification, another example of the process to derive the down-sampled luma samples of the collocated luma block for the CCLM is illustrated below, wherein the parameters and function numbers also corresponds to those in the VVC specification, for example, the two-dimensional arrays pDsY[x][y] are the down-sample luma samples.

The down-sampled collocated luma samples pDsY[ x ][ y ] with x = 0..nTbW − 1, y = 0..nTbH − 1 are derived as follows:
- If both SubWidthC and SubHeightC are equal to 1, the following applies:
  - pDsY[ x ][ y ] with x = 1..nTbW − 1, y = 1..nTbH − 1 is derived as follows:
pDstY[ x ][ y ] = pY[ x ][ y ] (355)
- Otherwise, the following applies:
  - The one-dimensional filter coefficients array F1 and F2, and the 2-dimensional filter coefficients arrays F3 and F4 are specified as follows.
F1[ 0 ] = 2, F1[ 1 ] = 1 (356)
F2[ 0 ] = 1, F2[ 1 ] = 2, F2[ 2 ] = 1 (357)
F3[ i ][ j ] = F4[ i ][ j ] = 0, with i = 0..2, j = 0..2 (358)
    – If both SubWidthC and SubHeightC are equal to 2, the following applies:
F1[ 0 ] = 1, F1[ 1 ] = 1 (359)
F3[ 0 ][ 1 ] = 1, F3[ 1 ][ 1 ] = 4, F3[ 2 ][ 1 ] = 1, F3[ 1 ][ 0 ] = 1, F3[ 1 ][ 2 ] = 1 (360)
F4[ 0 ][ 1 ] = 1, F4[ 1 ][ 1 ] = 2, F4[ 2 ][ 1 ] = 1 (361)
F4[ 0 ][ 2 ] = 1, F4[ 1 ][ 2 ] = 2, F4[ 2 ][ 2 ] = 1 (362)
    – Otherwise, the following applies:
F3[ 1 ][ 1 ] = 8 (363)
F4[ 0 ][ 1 ] = 2, F4[ 1 ][ 1 ] = 4, F4[ 2 ][ 1 ] = 2, (364)
  - If sps_chroma_vertical_collocated_flag is equal to 1, the following applies:
    - pDsY[ x ][ y ] with x = 1..nTbW − 1, y = 1..nTbH − 1 is derived as follows:
pDsY[ x ][ y ] = ( F3[ 1 ][ 0 ] * pY[ SubWidthC * x ][ SubHeightC * y − 1 ] +
F3[ 0 ][ 1 ] * pY[ SubWidthC * x − 1 ][ SubHeightC * y ] +
F3[ 1 ][ 1 ] * pY[ SubWidthC * x ][ SubHeightC * y ] + (365)
F3[ 2 ][ 1 ] * pY[ SubWidthC * x + 1 ][ SubHeightC * y ] +
F3[ 1 ][ 2 ] * pY[ SubWidthC * x ][ SubHeightC * y + 1 ] + 4 ) >> 3
  - pDsY[ 0 ][ y ] with y = 1..nTbH − 1 is derived as follows:
pDsY[ 0 ][ y ] = ( F3[ 1 ][ 0 ] * pY[ 0 ][ SubHeightC * y − 1] +
F3[ 0 ][ 1 ] * pY[ 0 ][ SubHeightC * y ] +
F3[ 1 ][ 1 ] * pY[ 0 ][ SubHeightC * y ] + (366)
F3[ 2 ][ 1 ] * pY[ 1 ][ SubHeightC * y ] +
F3[ 1 ][ 2 ] * pY[ 0 ][ SubHeightC * y + 1 ] + 4 ) >> 3
  - pDsY[ x ][ 0 ] with x = 1..nTbW − 1 is derived as follows:
pDsY[ x ][ 0 ] = ( F3[ 1 ][ 0 ] * pY[ SubWidthC * x ][ 0 ] +
F3[ 0 ][ 1 ] * pY[ SubWidthC * x − 1 ][ 0 ] +
F3[ 1 ][ 1 ] * pY[ SubWidthC * x ][ 0 ] + (368)
F3[ 2 ][ 1 ] * pY[ SubWidthC * x + 1 ][ 0 ] +
F3[ 1 ][ 2 ] * pY[ SubWidthC * x ][ 1 ] + 4 ) > 3
  - pDsY[ 0 ][ 0 ] is derived as follows:
pDsY[ 0 ][ 0 ] = ( F3[ 1 ][ 0 ] * pY[ 0 ][ 0 ] +
F3[ 0 ][ 1 ] * pY[ 0 ][ 0 ] +
F3[ 1 ][ 1 ] * pY[ 0 ][ 0 ] + (370)
F3[ 2 ][ 1 ] * pY[ 1 ][ 0 ] +

-continued

```
F3[ 1 ][ 2 ] * pY[ 0 ][ 1 ] + 4 ) >> 3
- Otherwise (sps_chroma_vertical_collocated_flag is equal to 0), the following applies:
  - pDsY[ x ][ y ] with x = 1..nTbW − 1, y = 0..nTbH − 1 is derived as follows:
    pDsY[ x ][ y ] = ( F4[ 0 ][ 1 ] * pY[ SubWidthC * x − 1 ][ SubHeightC * y ] +
               F4[ 0 ][ 2 ] * pY[ SubWidthC * x − 1 ][ SubHeightC * y + 1 ] +
               F4[ 1 ][ 1 ] * pY[ SubWidthC * x ][ SubHeightC * y ] +      (374)
               F4[ 1 ][ 2 ] * pY[ SubWidthC * x ][ SubHeightC * y + 1 ] +
               F4[ 2 ][ 1 ] * pY[ SubWidthC * x + 1 ][ SubHeightC * y ] +
      F4[ 2 ][ 2 ]*pY[SubWidthC *x + 1 ][SubHeightC * y + 1 ] + 4 ) >> 3
  - pDsY[ 0 ][ y ] with y = 0..nTbH − 1 is derived as follows:
    pDsY[ 0 ][ y ] = ( F4[ 0 ][ 1 ] * pY[ 0 ][ SubHeightC * y ] +
               F4[ 0 ][ 2 ] * pY[ 0 ][ SubHeightC * y + 1 ] +
               F4[ 1 ][ 1 ] * pY[ 0 ][ SubHeightC * y ] +                  (375)
               F4[ 1 ][ 2 ] * pY[ 0 ][ SubHeightC * y + 1 ] +
               F4[ 2 ][ 1 ] * pY[ 1 ][ SubHeightC * y ] +
               F4[ 2 ][ 2 ] * pY[ 1 ][ SubHeightC * y + 1 ] + 4 ) >> 3.
```

According to this embodiment, the reference sample substitution process as specified in clause 8.4.5.2.8 in VVC specification is used to substitute those unavailable reference samples for the CCLM modes.

Figure 7:
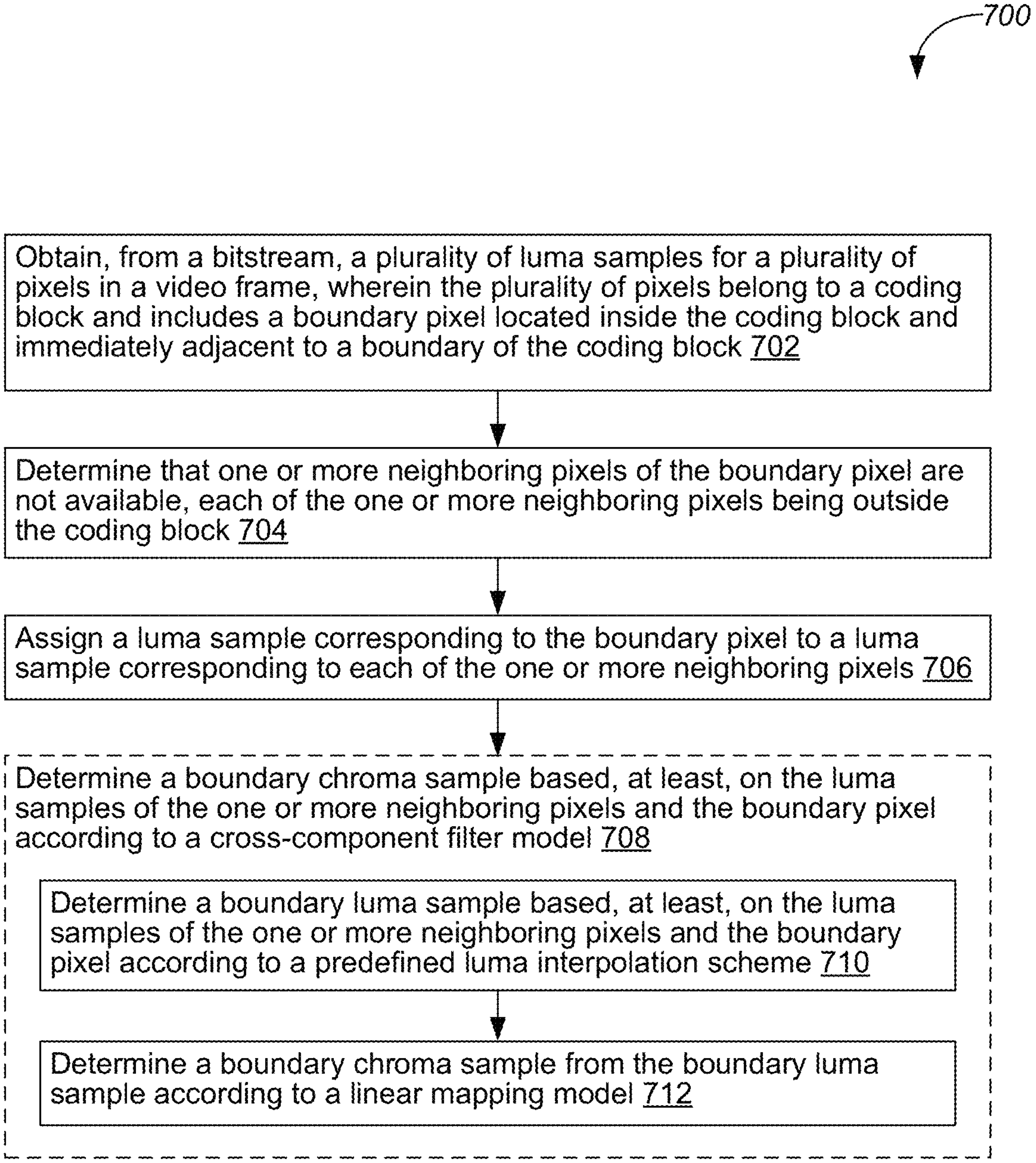
FIG. 7 is a flowchart of a video data decoding method implemented at an electronic device, in accordance with some embodiments.

FIG. 7 is a flowchart of a video data decoding method 700 implemented at an electronic device, in accordance with some embodiments. A plurality of luma samples 504 for a plurality of pixels in a video frame is obtained (702) from a bitstream. The plurality of pixels includes a boundary pixel located inside a coding block 506 and immediately adjacent to a boundary 602 of the coding block 506. The electronic device determines (704) that one or more neighboring pixels of the boundary pixel are not available. Each of the one or more neighboring pixels is outside the coding block 506. A luma sample (e.g., 504G-2 in FIG. 6C) corresponding to the boundary pixel is assigned (706) to a luma sample (e.g., 504G-6 in FIG. 6C) corresponding to each of the one or more neighboring pixels. The electronic device determines a boundary chroma sample (e.g., 502G in FIG. 6C) based, at least, on the luma samples (e.g., 502G-1 to 502G-6) of the one or more neighboring pixels and the boundary pixel based on a cross-component filter model 120. Specifically, the electronic device determines (710) a boundary luma sample (e.g., 508G in FIG. 6C) based, at least, on the luma samples (e.g., 502G-1 to 502G-6) of the one or more neighboring pixels and the boundary pixel according to a predefined luma interpolation scheme 510. The boundary chroma sample (e.g., 502G in FIG. 6C) is determined (712) from the boundary luma sample according to a linear mapping model 512.

In some embodiments, the predefined luma interpolation scheme 510 is determined based on at least a location of the boundary pixel, and the one or more neighboring pixels are adjacent to the boundary pixel based on the predefined luma interpolation scheme 510. In some situations, the predefined luma interpolation scheme 510 is also determined based on a subsampling scheme in which the luma samples and chroma samples of the plurality of pixels comply with a three-part Y'CbCr ratio. In some situations, the predefined luma interpolation scheme 510 is also determined based on a syntax element (e.g., "sps_chroma_collocated_vertical_flag") derived from the bitstream. Optionally, the predefined luma interpolation scheme 510 corresponds to one of cross, block, or T-shape filter configurations.

In some embodiments, the one or more neighboring pixels of the boundary pixel are external to the video frame or an image slice. In some embodiments, the one or more neighboring pixels of the boundary pixel has not been coded yet and will be coded subsequently to the coding block.

In some embodiments, the plurality of pixels includes a first set of pixels that are entirely enclosed in the coding block. An internal luma sample (e.g., 508A, 508C and 508F in FIGS. 6A-6C) is determined from a set of luma samples corresponding to the first set of pixels according to the predefined luma interpolation scheme 510. An internal chroma sample (e.g., 502A, 502C and 502F in FIGS. 6A-6C) corresponding to the first set of pixels is determined based on the internal luma sample according to the linear mapping model 512.

In some embodiments, e.g., in FIG. 6A, the plurality of pixels further includes an internal pixel that is inside the coding block and corresponds to an internal luma sample (e.g., 504B-3, 504B-4). The boundary luma sample (e.g., 508B) is determined based on both the internal luma sample (e.g., 504B-3, 504B-4) of the internal pixel and the luma samples (e.g., 504B-1, 504B-2) of the one or more neighboring pixels and the boundary pixel according to the predefined luma interpolation scheme 510.

In some embodiments, e.g., in FIG. 6A, the boundary pixel is a first boundary pixel (e.g., corresponding to a luma sample 504B-2), and the one or more neighboring pixels include one or more first neighboring pixels (e.g., corresponding to a luma sample 504B-1). The plurality of pixels includes a second boundary pixel (e.g., corresponding to a luma sample 504B-5) inside the coding block 506 and immediately adjacent to a respective block boundary 602 of the coding block 506. The electronic device creates one or more second neighboring pixels (e.g., corresponding to a luma sample 504B-6) immediately adjacent to the second boundary pixel. Each of the one or more second neighboring pixels is outside the coding block 506. A luma sample (e.g., 504B-5) corresponding to the second boundary pixel is assigned to a luma sample (e.g., 504B-6) corresponding to each of the one or more second neighboring pixels, wherein the boundary luma sample 508B is determined based on at least the luma samples of both the first and second boundary pixels (e.g., corresponding to the luma samples 504B-2 and 504B-5) and the first and second neighboring pixels (e.g., corresponding to the luma samples 504B-1 and 504B-6) according to the predefined luma interpolation scheme 510.

In some embodiments, e.g., in FIG. 6B, the one or more neighboring pixels includes only one neighboring pixel (e.g., corresponding to a luma sample 504D-5) that is on an opposite side of the boundary 602A with respect to the boundary pixel (e.g., corresponding to a luma sample 504D-1) and has the corresponding luma sample (e.g., 504D-5) assigned from the luma sample (e.g., 504D-1) corresponding to the boundary pixel.

In some embodiments, e.g., in FIG. 6C, the boundary includes a first boundary 602A, and the boundary pixel (e.g., corresponding to a luma sample 504G-2) is immediately adjacent to a corner of the coding block formed between the first boundary 602A and a second boundary 602C perpendicular to the first boundary 602A. The one or more neighboring pixels includes a first neighboring pixel (e.g., corresponding to a luma sample 504G-1) that is on an opposite side of the first boundary 602A with respect to the boundary pixel, and at least one of (1) a second neighboring pixel (e.g., corresponding to a luma sample 504G-5) that is on an opposite side of the second boundary with respect to the boundary pixel and (2) a third neighboring pixel (e.g., corresponding to a luma sample 504G-6) that opposes the boundary pixel over the corner of the coding block 506C.

In some embodiments, in accordance with a subsampling scheme, luma samples and chroma samples of the plurality of pixels comply with a three-part Y'CbCr ratio having one of the following ratio values: (1) 4:1:1 in which every four horizontal pixels correspond to four luma samples, a blue-difference chroma sample Cb and a red-difference chroma sample Cr; (2) 4:2:0 in which every four pixels in each 2×2 pixel block correspond to four luma samples, a blue-difference chroma samples Cb and a red-difference chroma sample Cr; (3) 4:2:2 in which every four pixels correspond to four luma samples, two blue-difference chroma samples Cb and two red-difference chroma samples Cr; and (4) 4:4:4 in which every four pixels correspond to four luma samples, four blue-difference chroma samples Cb and four red-difference chroma samples Cr.

In some embodiments, in accordance with the predefined luma interpolation scheme, six neighboring luma samples 504 in a 2×3 sub-array are down-sampled to an alternative luma sample 508, and each of left and right columns of luma samples in the 2×3 array is used at least twice to generate alternative luma samples on the same row, e.g., in FIGS. 6A, 6C and 6D. In some embodiments, in accordance with the predefined luma interpolation scheme, five neighboring luma samples 504 are down-sampled to an alternative luma sample 508 and arranged in a cross-shaped sub-array centered at a center pixel, e.g., in FIG. 6B.

In some embodiments, the bitstream is obtained where a second plurality of luma samples 518 and a second plurality of chroma samples 516 for a second plurality of pixels in the video frame can be obtained. An alternative plurality of luma samples 514 are determined and have the same resolution as the plurality of chroma samples 516 according to the predefined luma interpolation scheme 510. A first parameter a and a second parameter 3 are determined for the linear mapping model 512 by using the alternative plurality of luma samples 514 and the second plurality of chroma samples 516. Further, in some embodiments, the boundary chroma sample Y is determined from the boundary luma sample X according to the linear mapping model 512 as follows that is described in equation (1). Referring to FIG. 5, in some embodiments, two largest luma samples 514A-4 and 514A-5 are determined among the alternative plurality of luma samples 514, and two smallest luma samples 514B-4 and 514B-5 are determined among the alternative plurality of luma samples 514. The two largest luma samples 514A-4 and 514A-5 are averaged to a first luma value, and the two smallest luma samples 514B-4 and 514B-5 are averaged to a second luma value. Two first chroma samples 516A-4 and 516A-5 are determined among the second plurality of chroma samples 514 associated with the two largest luma samples 514A-4 and 514A-5. Two second chroma samples 516B-4 and 516B-5 are determined among the second plurality of chroma samples associated with the two smallest luma samples 514B-4 and 514B-5. Values of the two first chroma samples 516A-4 and 516A-5 are averaged to a first chroma value corresponding to the first luma value, and values of the two second chroma samples 516B-4 and 516B-5 are averaged to a second chroma value corresponding to the second luma value. The linear mapping model 512 is derived between chroma samples 502 and luma samples 508 based on the first and second luma values and the first and second chroma values.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method for decoding video data, comprising:

obtaining a bitstream;

obtaining a plurality of luma samples of a coding block from the bitstream, wherein the plurality of luma samples includes a luma sample corresponding to a boundary luma location adjacent to a boundary of the coding block or to an extension of the boundary;

in response to determining that one or more neighboring luma samples of the coding block are not available, assigning the luma sample corresponding to the boundary luma location to the one or more neighboring luma samples, wherein each of the one or more neighboring luma samples corresponding to a neighboring luma location being outside the coding block and close to the boundary luma location;

determining a boundary luma sample based, at least, on the one or more neighboring luma samples and the luma sample corresponding to the boundary luma location according to a predefined luma interpolation scheme;

obtaining, from the bitstream, a second plurality of luma samples and a second plurality of chroma samples;

determining an alternative plurality of luma samples having a same resolution as the second plurality of chroma samples according to the predefined luma interpolation scheme;

deriving a first parameter a and a second parameter ß for a linear mapping model by using the alternative plurality of luma samples and the second plurality of chroma samples, comprising:

identifying two largest luma samples among the alternative plurality of luma samples;

identifying two smallest luma samples among the alternative plurality of luma samples;

determining a first luma value based on the two largest luma samples;

determining a second luma value based on the two smallest luma samples;

identifying two first chroma samples among the second plurality of chroma samples associated with the two largest luma samples;

identifying two second chroma samples among the second plurality of chroma samples associated with the two smallest luma samples;

determining a first chroma value corresponding to the first luma value based on the two first chroma samples;

determining a second chroma value corresponding to the second luma value based on the two second chroma samples; and deriving the linear mapping model between chroma values and luma values based on the first and second luma values and the first and second chroma values; and determining a boundary chroma sample from the boundary luma sample according to a the linear mapping model.

2. The method of claim 1, wherein the neighboring luma location comprises a top neighboring luma location, the top neighboring luma location comprises a location right to the top of the coding block, and/or a first upper left location to an upper left of the coding block.

3. The method of claim 1, wherein the neighboring luma location comprises a left neighboring luma location, the left neighboring luma location comprises a location straight to the left of the coding block and/or a second upper left location to an upper left of the coding block.

4. The method of claim 2, wherein the boundary luma location is inside the coding block and is adjacent to a top boundary of the coding block, or the boundary luma location is inside a left neighboring coding block and is adjacent to a left extension of the top boundary.

5. The method of claim 3, wherein the boundary luma location is inside the coding block and is adjacent to a left boundary of the coding block, or the boundary luma location is inside a top neighboring coding block and is adjacent to an upper extension of the left boundary.

6. The method of claim 1, wherein the predefined luma interpolation scheme is determined based on at least one of a subsampling scheme corresponding to the plurality of luma samples and a syntax element derived from the bitstream.

7. The method of claim 1, wherein the one or more neighboring luma samples are external to an image slice that overlaps a current coding block.

8. The method of claim 1, wherein the plurality of luma samples include a first set of luma samples, the method further comprising:

determining an internal luma sample from the first set of luma samples according to the predefined luma interpolation scheme; and determining an internal chroma sample corresponding to the first set of luma samples based on the internal luma sample according to the linear mapping model.

9. The method of claim 1, wherein the plurality of luma samples include an internal luma sample, and wherein the boundary luma sample is determined based on both the internal luma sample and the one or more neighboring luma samples and the luma sample corresponding to the boundary luma location according to the predefined luma interpolation scheme.

10. The method of claim 1, wherein the one or more neighboring luma samples include only one neighboring luma sample that is on an opposite side of the boundary with respect to the boundary luma location and has luma sample assigned from the luma sample corresponding to the boundary luma location.

11. The method of claim 1, wherein the boundary includes a first boundary, wherein the boundary luma location is adjacent to a corner of the coding block formed between the first boundary and a second boundary perpendicular to the first boundary, and wherein the one or more neighboring luma samples include a first neighboring luma sample that is on an opposite side of the first boundary with respect to the boundary luma location, and at least one of (1) a second neighboring luma sample that is on an opposite side of the second boundary with respect to the boundary luma location or (2) a third neighboring luma sample that opposes the boundary luma location over the corner of the coding block.

12. The method of claim 6, wherein in accordance with the subsampling scheme, luma samples and chroma samples of the coding block comply with a three-part Y'CbCr ratio having one of ratio values:

(1) 4:2:0 in which every four luma samples of a 2×2 luma sample block correspond to a blue-difference chroma samples Cb and a red-difference chroma sample Cr;

(2) 4:2:2 in which every four luma samples correspond to two blue-difference chroma samples Cb and two red-difference chroma samples Cr; or (3) 4:4:4 in which every four luma samples correspond to four blue-difference chroma samples Cb and four red-difference chroma samples Cr.

13. The method of claim 1, wherein in accordance with the predefined luma interpolation scheme, six luma samples in a 2×3 sub-array are down-sampled to an alternative luma sample, and at least two luma samples in each of left and right columns in the 2×3 array are used to generate the alternative luma sample.

14. The method of claim 1, wherein in accordance with the predefined luma interpolation scheme, five luma samples are down-sampled to an alternative luma sample and arranged in a cross-shaped sub-array centered at a center pixel.

15. The method of claim 1, wherein the boundary chroma sample, Y, is determined from the boundary luma sample, X, according to the linear mapping model that is described using equation:

$$Y=\alpha*X+B,$$

wherein α and β are parameters.

16. A video decoding device, comprising one or more processors and one or more storages coupled to the one or more processors, the video decoding device is configured to perform a method to decode a received bitstream, the method comprising:

obtaining a bitstream;

obtaining a plurality of luma samples of a coding block from the bitstream, wherein the plurality of luma samples includes a luma sample corresponding to a boundary luma location adjacent to a boundary of the coding block or to an extension of the boundary;

in response to determining that one or more neighboring luma samples of the coding block are not available, assigning the luma sample corresponding to the boundary luma location to the one or more neighboring luma samples, wherein each of the one or more neighboring luma samples corresponding to a neighboring luma location being outside the coding block and close to the boundary luma location;

determining a boundary luma sample based, at least, on the one or more neighboring luma samples and the luma sample corresponding to the boundary luma location according to a predefined luma interpolation scheme;

obtaining, from the bitstream, a second plurality of luma samples and a second plurality of chroma samples;

determining an alternative plurality of luma samples having a same resolution as the second plurality of chroma samples according to the predefined luma interpolation scheme;

deriving a first parameter a and a second parameter ß for a linear mapping model by using the alternative plurality of luma samples and the second plurality of chroma samples. comprising:

identifying two largest luma samples among the alternative plurality of luma samples;

identifying two smallest luma samples among the alternative plurality of luma samples;

determining a first luma value based on the two largest luma samples;

determining a second luma value based on the two smallest luma samples;

identifying two first chroma samples among the second plurality of chroma samples associated with the two largest luma samples;

identifying two second chroma samples among the second plurality of chroma samples associated with the two smallest luma samples;

determining a first chroma value corresponding to the first luma value based on the two first chroma samples;

determining a second chroma value corresponding to the second luma value based on the two second chroma samples; and deriving the linear mapping model between chroma values and luma values based on the first and second luma values and the first and second chroma values; and determining a boundary chroma sample from the boundary luma sample according to the linear mapping model.

17. The video decoding device of claim 16, wherein the neighboring luma location comprises a top neighboring luma location, the top neighboring luma location comprises a location right to a top of the coding block, and/or a first upper left location to an upper left of the coding block.

18. The video decoding device of claim 16, wherein the neighboring luma location comprises a left neighboring luma location, the left neighboring luma location comprises a location straight to a left of the coding block and/or a second upper left location to an upper left of the coding block.

19. A non-transitory computer readable storage medium storing a bitstream to be decoded by a method comprising:

obtaining the bitstream;

obtaining a plurality of luma samples of a coding block from the bitstream, wherein the plurality of luma samples includes a luma sample corresponding to a boundary luma location adjacent to a boundary of the coding block or to an extension of the boundary;

in response to determining that one or more neighboring luma samples of the coding block are not available, assigning the luma sample corresponding to the boundary luma location to the one or more neighboring luma samples, wherein each of the one or more neighboring luma samples corresponding to a neighboring luma location being outside the coding block and close to the boundary luma location;

determining a boundary luma sample based, at least, on the one or more neighboring luma samples and the luma sample corresponding to the boundary luma location according to a predefined luma interpolation scheme;

obtaining, from the bitstream, a second plurality of luma samples and a second plurality of chroma samples;

determining an alternative plurality of luma samples having a same resolution as the second plurality of chroma samples according to the predefined luma interpolation scheme;

deriving a first parameter a and a second parameter ß for a linear mapping model by using the alternative plurality of luma samples and the second plurality of chroma samples. comprising:

identifying two largest luma samples among the alternative plurality of luma samples;

identifying two smallest luma samples among the alternative plurality of luma samples;

determining a first luma value based on the two largest luma samples;

determining a second luma value based on the two smallest luma samples;

identifying two first chroma samples among the second plurality of chroma samples associated with the two largest luma samples:

identifying two second chroma samples among the second plurality of chroma samples associated with the two smallest luma samples;

determining a first chroma value corresponding to the first luma value based on the two first chroma samples;

determining a second chroma value corresponding to the second luma value based on the two second chroma samples; and deriving the linear mapping model between chroma values and luma values based on the first and second luma values and the first and second chroma values; and determining a boundary chroma sample from the boundary luma sample according to-a the linear mapping model.

* * * * *